(12) United States Patent
Sadiq et al.

(10) Patent No.: US 12,059,646 B2
(45) Date of Patent: Aug. 13, 2024

(54) ADSORPTION AND DESORPTION APPARATUS

(71) Applicant: Commonwealth Scientific and Industrial Research Organisation, Acton (AU)

(72) Inventors: Muhammad Munir Sadiq, Clayton South (AU); Michael Batten, Clayton South (AU); Aaron William Thornton, Clayton South (AU); Matthew Roland Hill, Clayton South (AU); Kristina Konstas, Clayton South (AU); James Ivan Mardel, Clayton South (AU); Choon Chian Ng, Clayton South (AU); Xavier Mulet, Clayton South (AU); Xingdong Wang, Clayton South (AU)

(73) Assignee: COMMONWEALTH SCIENTIFIC AND INDUSTRIAL RESEARCH ORGANISATION, Acton (AU)

(*) Notice: Subject to any disclaimer, the term of this patent is extended or adjusted under 35 U.S.C. 154(b) by 483 days.

(21) Appl. No.: 17/296,749

(22) PCT Filed: Dec. 6, 2019

(86) PCT No.: PCT/AU2019/051337
§ 371 (c)(1),
(2) Date: May 25, 2021

(87) PCT Pub. No.: WO2020/113281
PCT Pub. Date: Jun. 11, 2020

(65) Prior Publication Data
US 2022/0134307 A1    May 5, 2022

(30) Foreign Application Priority Data
Dec. 7, 2018  (AU) ................................. 2018904665

(51) Int. Cl.
*B01D 53/02* (2006.01)
*B01D 53/04* (2006.01)
(Continued)

(52) U.S. Cl.
CPC ............ *B01D 53/02* (2013.01); *B01J 20/226* (2013.01); *C09D 7/65* (2018.01);
(Continued)

(58) Field of Classification Search
None
See application file for complete search history.

(56) References Cited

U.S. PATENT DOCUMENTS 9,308,486 B2 * 4/2016 Chen .................. B01D 53/0438
9,370,749 B2   6/2016 Addleman et al.
(Continued)

FOREIGN PATENT DOCUMENTS

CN        104602794 B  *  3/2016 ............... A61L 9/00
KR        10-1269837 B1     5/2013
(Continued)

OTHER PUBLICATIONS

CN-104602794-ENG (Clarivate/PE2E SEARCH machine translation of Haraga) (Year: 2016).*
(Continued)

*Primary Examiner* — Gabriel E Gitman
(74) *Attorney, Agent, or Firm* — Merchant & Gould P.C.

(57) ABSTRACT

An adsorption apparatus and associated method for capturing a target gaseous adsorbate from an atmospheric air based gaseous feed stream. The adsorption apparatus includes a housing enclosing at least one adsorption element for adsorbing the target gaseous adsorbate, at least one substrate coated with an adsorptive composite coating that comprises at least 50 wt % metal organic framework and at least one binder, the housing having an inlet through which the
(Continued)

gaseous feed stream can flow to the adsorption element and an outlet through which gas can flow out from the housing; and a desorption arrangement in contact with and/or surrounding the at least one adsorption element.

21 Claims, 14 Drawing Sheets

(51) Int. Cl.
    *B01J 20/22*     (2006.01)
    *B01J 20/28*     (2006.01)
    *C09D 7/65*     (2018.01)

(52) U.S. Cl.
    CPC .... *B01D 2253/204* (2013.01); *B01D 2256/10* (2013.01); *B01D 2257/504* (2013.01)

(56) References Cited

U.S. PATENT DOCUMENTS

| | | | |
|---|---|---|---|
| 9,457,340 B2 | 10/2016 | Buelow et al. | |
| 9,504,986 B2 | 11/2016 | Zaworotko et al. | |
| 2009/0032023 A1 | 2/2009 | Pastre et al. | |
| 2011/0010826 A1 | 1/2011 | Kaskel | |
| 2011/0260100 A1 | 10/2011 | Trukhan et al. | |
| 2013/0017141 A1* | 1/2013 | Cote | B01J 20/28061 564/309 |
| 2013/0061756 A1* | 3/2013 | Hung | B01D 53/0438 96/126 |
| 2014/0271394 A1* | 9/2014 | Jiang | B01J 20/28045 427/282 |
| 2015/0136316 A1 | 5/2015 | Chen et al. | |
| 2016/0166970 A1 | 6/2016 | Boehringer et al. | |
| 2016/0167016 A1 | 6/2016 | Li et al. | |
| 2017/0203261 A1 | 7/2017 | Eddaoudi et al. | |
| 2018/0036688 A1 | 2/2018 | Sundaram et al. | |
| 2018/0118974 A1 | 5/2018 | Henninger et al. | |
| 2018/0178191 A1 | 6/2018 | Schwab et al. | |
| 2018/0296961 A1* | 10/2018 | Jiang | B01D 46/2429 |
| 2019/0039047 A1* | 2/2019 | Kimura | B01J 20/28069 |
| 2019/0046919 A1* | 2/2019 | Liu | B01D 53/0473 |

FOREIGN PATENT DOCUMENTS

| | | | | |
|---|---|---|---|---|
| KR | 20180117023 A | * | 10/2018 | ............. B01J 20/08 |
| WO | 2008/062034 A1 | | 5/2008 | |
| WO | WO-2013083992 A1 | * | 6/2013 | ............. B01J 20/20 |
| WO | 2014/074679 A1 | | 5/2014 | |
| WO | 2017/004682 A1 | | 1/2017 | |
| WO | 2017/203252 A1 | | 11/2017 | |
| WO | 2018/036997 A1 | | 3/2018 | |
| WO | 2018/075933 A1 | | 4/2018 | |
| WO | 2018/118105 A1 | | 6/2018 | |
| WO | 2020/034008 A1 | | 2/2020 | |

OTHER PUBLICATIONS

KR20180117023A_ENG (Espacenet machine translation of Hong) (Year: 2018).*
Kumar et al. (2017, Hybrid ultramicroporous materials (HUMs) with enhanced stability and trace carbon capture performance. Chemical Communications, 53(44), 5946-5949). (Year: 2017).*
Frankel (2004, Pharmaceutical Facilities Plumbing Systems—4.4.1 Water Vapor in the Air. (pp. 71). American Society of Plumbing Engineers (ASPE)). (Year: 2004).*
Extended European Search Report for European Patent Application No. 19894313.6 mailed Aug. 3, 2022, 13 pages.
Elsaidi, S. et al., "Hydrophobic pillared square grids for selective removal of $CO_2$ from simulated flue gas", Chemical Communications, 51(85): 15530-15533 (Jan. 2015).
Denny, M. et al., "Multicomponent metal-organic framework membranes for advanced functional composites", Chem. Sci., 9: 8842-8849 (2018).
Duan, J. et al., "Metal-organic framework adsorbents and membranes for separation applications", Current Opinion in Chemical Engineering, 20: 122-131 (2018).
Moreton, J. et al., "High MOF loading in mixed-matrix membranes utilizing styrene/butadiene copolymers", Chem. Commun, 52: 14376-14379 (2016).
Zhang. Y. et al., "Preparation of Nanofibrous Metal-Organic Framework Filters for Efficient Air Pollution Control", Journal of the American Chemical Society, 138: 5785-5788 (2016).
International Search Report and Written Opinion of the International Searching Authority for International Patent Application No. PCT/AU2019/051337 mailed Feb. 13, 2020, 12 pages.
International-type search for provisional patent application for Australian Patent Application No. 2018904665 mailed Feb. 1, 2019, 15 pages.
International-type search for provisional patent application for Australian Patent Application No. 2018904665 mailed Apr. 17, 2019, 13 pages.

* cited by examiner

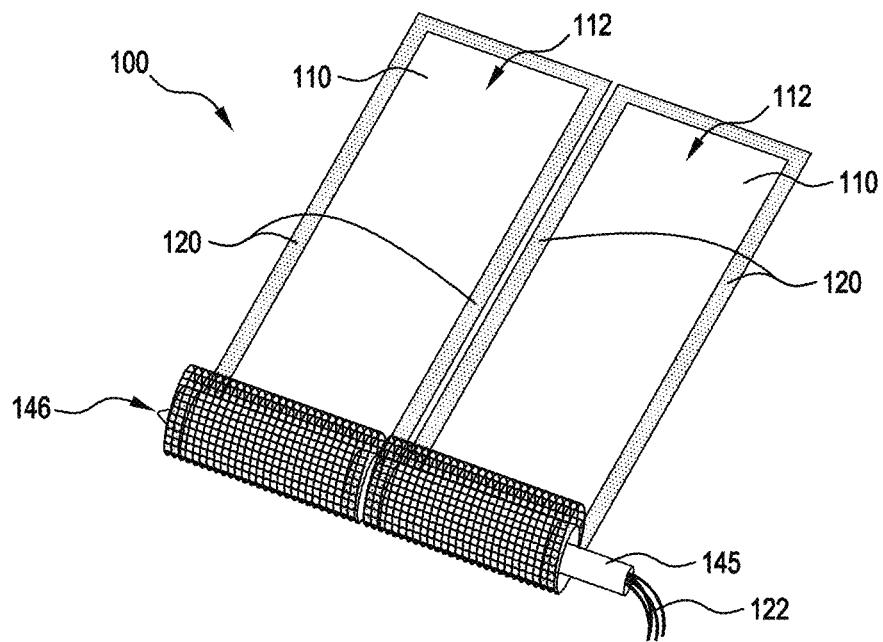
*Figure 4 (d)*
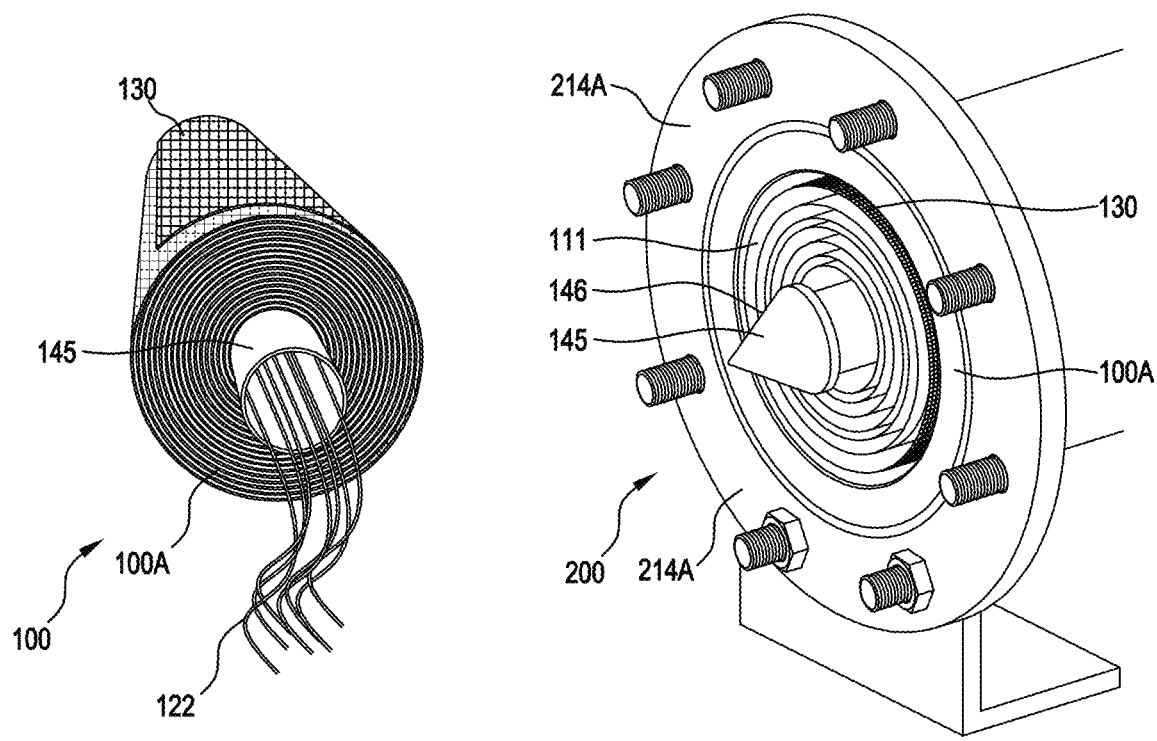
*Figure 4 (e)*  *Figure 4 (f)*

ADSORPTION AND DESORPTION APPARATUS

CROSS-REFERENCE

This application is a National Stage Application of PCT/AU2019/051337, filed on 6 Dec. 2019, which claims priority from Australian Provisional Patent Application No. 2018904665 filed on 7 Dec. 2018 the contents of which are incorporated herein by this reference. To the extent appropriate, a claim of priority is made to each of the above-disclosed applications.

TECHNICAL FIELD

The present invention generally relates to an apparatus and system for selectively adsorbing a gas, preferably an atmospheric gas, and desorption of the selected gas providing an isolated, purified gas. The invention is particularly applicable to adsorbents for gas and/or vapour using Metal Organic Frameworks/Metal Organic Materials.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Gases such as carbon dioxide and nitrogen can be directly extracted from atmospheric air using organic-inorganic hybrid sorbents, a chemical reaction or chemical absorbents. For example, aqueous basic solutions can be used as chemical adsorbents because they offer the opportunity to continuously contact the feed air with the solution in the presence of contaminants and other constituents in the air. However, the current commercial processes and supply chains are limited by their point sources of these gases, by their large and expensive fixed infrastructure, large regeneration energy, the complex nature of processing systems and by long transport distances to end users.

Alternate adsorbent processes are being developed using newly developed classes of solid adsorbents. One class of solid adsorbents of interest are Metal-Organic Frameworks (MOFs) or Metal-Organic Materials (MOMs)—hereinafter referred to generally as MOFs. MOFs are a porous solid material which offers exceptional porosity with tuneable metrics, organic functionality and high stability. MOFs have been investigated widely in the past decade in the fields of storage and separation of gas molecules as well as catalysis.

A drawback of MOFs is that the large storage capacity that is commonly reported cannot be completely used in practical applications without consuming a large amount of energy to properly desorb any material adsorbed on the material using high temperatures and/or strong vacuums.

A more energy efficient MOF based desorption process can be provided by using a magnetic framework composite (MFC), a material that combines magnetic nanoparticles (MNPs) with MOF crystals. When exposing this hybrid material to an alternating current magnetic field, heat is generated locally by magnetic nanoparticles within the MOF. Thus, energy consumption of adsorbent regeneration is promised to be reduced significantly compared to conventional processes like VSA, PSA and TSA.

However, these types of magnetic composite materials are typically required to be used within a packed bed which by its nature has a large pressure drop caused by the intimate packing of the adsorption material. Such pressure drop is not ideal when adsorbing a gas content from ambient air as a large volume of gas needs to flow through the adsorbent apparatus to extract the selected gas content from a gaseous mixture.

Another drawback with MOFs is that it can be difficult to achieve adsorption selectivity for a particular gas present at low levels in the atmosphere due to competition with other gases or water molecules present in the atmosphere.

It is therefore desirable to provide an alternate gas adsorption system for extracting a selected gas content from atmospheric air.

SUMMARY OF THE INVENTION

The present invention provides an alternate MOF based adsorption apparatus incorporating a MOF based adsorption element, and an associated adsorption method.

Adsorption Apparatus

A first aspect of the present invention provides an adsorption apparatus for capturing a target gaseous adsorbate from an atmospheric air based gaseous feed stream, comprising: a housing enclosing at least one adsorption element for adsorbing the target gaseous adsorbate, the at least one adsorption element comprising at least one substrate coated with an adsorptive composite coating that comprises or consists of at least 50 wt % metal organic framework and at least one binder, the housing having an inlet through which the gaseous feed stream can flow to the adsorption element and an outlet through which gas can flow out from the housing; and a desorption arrangement in contact with and/or surrounding the at least one adsorption element, the desorption arrangement being selectively operable between (i) a deactivated state, and (ii) an activated state in which the arrangement is configured to heat, apply a reduced pressure or a combination thereof to the adsorptive composite coating to desorb at least a portion of the adsorbed target gaseous adsorbate from the adsorptive composite coating.

This first aspect of the present invention therefore provides an adsorption apparatus that includes an adsorption element having a coating, preferably a thin (less than 200 μm) adsorptive composite coating formed from a selected MOF and at least one binder configured to adsorb a selected target gaseous adsorbate from an atmospheric air based gaseous feed stream. The use of an adsorptive composite coating advantageously enables the MOF to be coated on the surface of a large number of articles and materials which can be selected and appropriately configured for particular adsorption conditions in an adsorption apparatus. The apparatus also includes a desorption arrangement that enables selective desorption and thus harvesting of the target gaseous adsorbate that is captured on that adsorption element.

The adsorptive composite coating preferably has a thickness of less than 200 μm, preferably no more than 100 μm, and more preferably no more than 80 μm. Furthermore, the adsorptive composite coating preferably has a thickness greater than 30 μm, preferably greater than 40 μm, and more preferably about 50 μm. A thin coating of these dimensions provides sufficient thickness for the adsorbate to be captured in the MOF within the coating structure. However, if the coating is too thick that the adsorbate is not able to be diffuse or otherwise reach the MOF through the entire thickness of the coating.

The adsorptive composite coating is configured to allow gas adsorption and desorption from the MOF content therein. To assist with this function, it is preferred that each substrate is coated with the adsorptive composite coating on two opposing sides.

The housing enclosing at least one adsorption element can contain any reasonable volumetric loading of MOF suitable for the particular adsorbate adsorption conditions and adsorption rate. In some embodiments, the housing contains a loading of at least 30 $kg/m^3$ of adsorptive composite coating, preferably at least 50 $kg/m^3$ and more preferably around 60 $kg/m^3$.

Adsorbate

The apparatus and method are configured to capture and release a selected target gaseous adsorbate species from an atmospheric air based gaseous feed stream. It is to be understood that an atmospheric air based gaseous feed stream comprises an airstream that is derived from air captured from an atmospheric air source. That atmospheric air source may be at any height (for example ground level or at some height above or below ground level) and may include pollutants or other gases that may be included in the atmospheric air at the location of collection or capture.

The adsorption element of the present invention can be configured to adsorb and release a variety of adsorbate species. As should be appreciated, the MOF included in the adsorptive composite coating would be selected to have the required adsorptive and selectivity properties for a particular target gaseous adsorbate. For example, where the target adsorbate comprises carbon dioxide and the metal organic framework comprises at least one of SIFSIX-3-Ni or TIFSIX-3-Ni.

A number of other gaseous adsorbates could also be targeted. In particular embodiments, the adsorption element of the adsorption apparatus of the present invention is configured to adsorb and release one or more gas components of atmospheric air. Examples of target adsorbates include an atmospheric gas selected from at least one of hydrogen, oxygen, argon, carbon dioxide, carbon dioxide neon, or methane.

In some embodiments, the adsorbate may comprise carbon dioxide. In other embodiments, the adsorbate may comprise oxygen. The capture oxygen might, for example be adsorbed from outside air and added to indoor air. In other embodiments, the adsorbate may comprise oxygen or $CO_2$ which might be adsorbed from air in varying amounts to provide a nitrogen like inert gas feed for things that are sensitive to the presence of oxygen or $CO_2$.

In other embodiments, the adsorbate may comprise one of wherein the target gaseous adsorbate is selected from the group consisting of hydrogen, argon, carbon monoxide, neon, and methane.

The invention is most preferably used to adsorb $CO_2$ from air comprising less than 500 ppm of $CO_2$. The invention can also be used to adsorb $CO_2$ from air comprising less than 500 ppm of $CO_2$ and $H_2O$ concentrations at least 1000 ppm with greater than 50% selectivity for $CO_2$ than $H_2O$. Preferably, selectivity for $CO_2$ from a gaseous stream comprising water is greater than 80%. The invention can also be adapted for use in environments having higher levels of $CO_2$. For example, the invention can be used to adsorb $CO_2$ and purify air in enclosed environments having $C_{O2}$ levels of at less than 1.5%, more preferably less than 500 ppm. Alternatively, the invention can be used to adsorb $CO_2$ from flue gas where $C_{O2}$ levels are up to 5% from combustion of natural gas or 14 to 18% for from combustion of coal.

Binder

The binder used in the adsorptive composite coating can comprise a single binder or a mixture of two or more binders (binder components). Traditionally, a binder or binder mixture is used to provide the required mechanical properties to the adsorptive composite coating. The inventors have surprising found that binders can be used to increase selectivity of a target gaseous adsorbate from an atmospheric air based gaseous feed stream comprising a mixture of gases and water molecules.

The MOF:binder ratio within the adsorptive composite coating is preferably 7.8:1 to 200:1 based on total wt % of solids in the adsorptive composite coating, preferably, 7.9:1. The adsorptive composite coating preferably comprises 80 to 97% MOF (wt % based on total solids content in the adsorptive composite coating). It should be appreciated that the amount of binder is selected based on the properties and particle size (mean size and particle distribution) of the MOF and the application of the MOF. In embodiments, the adsorptive composite coating preferably comprises/consists of 80 to 97% MOF and 0.5 to 13 binder (wt % based on total solids content in the adsorptive composite coating). The adsorptive composite coating may also comprise a trace solvent content from process of applying the adsorptive composite coating to the substrate.

Binder Selection

The binder or mixture of binders used in the composite adsorptive coating are generally selected based on the following criteria:

Melting point—the melting point of the binder is typically higher than the activation temperature to desorb the adsorbate species from the MOF. In embodiments, the melting point of the binder is at least 20° C. higher than the activation temperature to desorb the adsorbate species from the MOF, preferably at least 50° C. higher than that activation temperature;

Polarity—affinity to adsorbate species or ability to repel or exclude adsorbate species;

Hydrophobicity or hydrophilicity;

Molecular weight and particle size—the binder should have a sufficient size/molecular weight to bind the MOF particles together. Too small molecular weight and the mixture can be too powdery and the binder may have a particle size capable of blocking the pores of the MOF. In some embodiments, the molecular weight of the binder is at least 1 kDa. In other embodiments, the molecular weight of the binder is preferably at least 30 kDa, preferably at least 50 kDa, and more preferably at least 100 kDa;

Chemical compatibility with solvent and MOF;

Porosity of the MOF; and

Required mechanical properties of the adsorptive composite coating.

Following the above criteria, a variety of different binders can be used to suit the intended adsorption application of the adsorptive composite coating.

Hydrophilic Binder

In some embodiments, one or more of the binders used in the adsorptive composite coating is hydrophilic. Any suitable hydrophilic binder can be used.

Preferred hydrophilic binders include polyvinylpyrrolidone (PVP), polyvinyl alcohol (PVA), thermo plastic polyurethane or hydroxypropylcellulose (HPC) with a molecular weight of 1 kDa to 1200 kDa.

Hydrophobic Binder

One or more of the binders used in the adsorptive composite coating is hydrophobic in some embodiments. The inventors have found that a hydrophobic binder can used to impart optimal, selective adsorption properties to the adsorptive composite coating for hydrophobic adsorption applications, for example carbon dioxide or oxygen adsorption where competitive water adsorption is ideally reduced or substantially avoided. In this respect, competitive moisture adsorption when using atmospheric air can deliriously affect the adsorption or desorption of the desired adsorbate for a number of MOFs. A hydrophobic binder assists in the reduction of water adsorptive properties of the adsorptive composite coating.

A variety of hydrophobic binders may be used in the adsorptive composite coating. The binder is selected to not block the pores of the MOF. In some embodiments, the binder is selected from at least one of a poly acrylate, a poly vinyl acetal, a polyurethane, rhodopol, poly (hydroxymethyl) siloxane (PMHS), siloxane-cellulose polymers and derivatives (including poly (hydroxymethyl) siloxane, cellulose methyl siloxane or cellulose amino methyl siloxane), methyl cellulose (MC), hydroxy propyl cellulose, hydroxyl methyl cellulose, ethylhydroxy ethylcellulose, carboxymethylcellulose, other cellulosic polymers, starches, other natural product gums, polyolefins, polyacrylates, polymethacrylates, polystyrenics, polyurethanes, polyacetals, polyethylene imine, polyvinylpyrrolidone, polyisobutene, polyimides, polysulfones, polycarbonates, polyvinyls (including poly (ethyl vinyl acetate), polyvinyl butryal and polyvinyl alcohol), polytetrahydrofuran, fluorinated polymers, polysiloxanes and other silicon-containing polymers, or an ionic polymer. The binder can be made of a single polymer or a blend of two or more polymers. The polymers used for the binder may be in the form of ionic polymers (such as Surlyn$^T$M), dendrimers, branched polymers, thermoset polymers such as epoxies, polyureas and may have the form of regular block copolymers or random copolymers.

Where the binder is a cellulosic polymer, the cellulosic polymers can be generally described as:

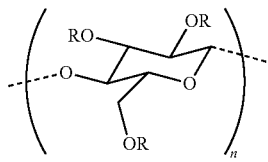

wherein R=H or R=any other C1-C6 alkyl with a MW greater than 250 kDa. For molecular weight greater than 250 kDa, more R groups would be substituted with R groups. For example, HPC with a MW greater than 250 kDa will have R=H or CH$_2$CH(OH)CH$_3$ with more R groups substituted with CH$_2$CH(OH)CH$_3$. Similarly, MC with a MW greater than 250 kDa will have R=H or R=Me with more R groups substituted with Me.

Specific examples of binders include at least one of: poly (hydroxymethyl) siloxane (PMHS), cellulose methyl siloxane, cellulose amino methyl siloxane, ethylene butyl acrylate (EBA), Polyvinyl butyral (PVB), Thermoplastic Polyurethane Resin (TPU), methyl cellulose (MC), and/or hydroxy propyl cellulose (HPC). Preferred hydrophobic binders include poly (hydroxymethyl) siloxane (PMHS) with a molecular weight of 1 to 5 kDa, preferably, 1.7 to 3.2 kDa, cellulose methyl siloxane or cellulose amino methyl siloxane with a molecular weight of 50 kDa to 100 kDa, preferably 86 kDa, poly (ethyl vinyl acetate), methyl cellulose (MC), hydroxypropylcellulose (HPC) with a molecular weight of 250 kDa to 1200 kDa, preferably 1000 kDa.

It should be appreciated that the binder can comprise or consist of a single binder or a mixture of binder two or more binders. The binder can therefore consist of a single binder or two more or more binders. In some embodiments, the binder can comprise a single component or two or more components and a solvent. In embodiments, the binder comprises at least two binder components selected from a hydrophobic binder and a further binder to assist in adhering the coating to the substrate. In these embodiments it is preferred that the hydrophobic binder primarily functions as an intra-coat binder to bind the composition of the adsorptive composite coating together and the further binder which functions as an inter-coat binder to assist in adhering the coating to the substrate. The further binder (inter-coat binder) is preferably selected from at least one of ethylene butyl acrylate (EBA), Polyvinyl butyral (PVB), Thermoplastic Polyurethane Resin (TPU), or a cellulose ether preferably selected from at least one of methyl cellulose (MC), ethylhydroxy ethylcellulose (EHEC), hydroxybutylcellulose (HBC), hydroxybutyl methylcellulose (HBMC), hydroxyethylcellulose (HEC), Hydroxymethylcellulose (CMC), hydroxypropylcellulose (HPC), hydroxypropyl methylcellulose (HPMC), hydroxyethylmethylcellulose (HEMC), sodium carboxy methylcellulose (Na-CMC). As indicated above, the hydrophobic binder (intra-coat binder) can be selected from the binders described above.

Where a hydrophobic binder is required for adsorption selectivity, a key aspect of the present invention is the use of a siloxane based binder for adsorption of gases. For example, the inventors have shown that an adsorptive composite coating comprising poly (hydroxymethyl) siloxane (PMHS), cellulose methyl siloxane or cellulose amino methyl siloxane have selectivity for direct air capture of carbon dioxide from a gaseous feed stream comprising a mixture of gases and water.

It should be appreciated that $CO_2$ and $H_2O$ are similar in size. Therefore, for applications such as direct air capture (DAC), a hydrophobic binder is an essential component enabling capture of $CO_2$ and repelling the capture of $H_2O$.

In particular embodiments, the hydrophobic binder comprises at least one siloxane compound, for example a siloxane-cellulose polyester or derivative thereof, preferably a cellulose-disiloxane polyester or a cellulose-oligosiloxane polyester. It should be appreciated that the siloxane in the siloxane compound is present either alone or forms an adduct with a cellulose compound. This type of hydrophobic binder advantageously includes both a polar structural section (siloxane section) and a non-polar structure (long chain polymer section). Whilst not wishing to be limited to any one theory, It is thought that the polar-non-polar structure assists in two functions, with the polar structure (for example siloxane component) bonds/packs with the MOF in a manner that creates a 3D porous structure in the coating forming a gas permeable structure in the coating layer, and the non-polar structure provides the required hydrophobicity.

The adsorptive composite coating comprises or consists of MOF and the binder composition. In exemplary examples, the binder comprises or consists of a mixture of hydroxypropylcellulose (HPC) and a siloxane compound (as discussed above), and preferably HPC and a siloxane compound selected from at least one of poly (hydroxymethyl) siloxane (PMHS), cellulose methyl siloxane, or cellulose amino methyl siloxane. In these embodiments, the siloxane compound binder is preferably included in the adsorptive composite coating between 0.2 and 5 wt % (based on total solids content in the adsorptive composite coating), more preferably between 1 and 5 wt %, more preferably between 1 and 4 wt %, and yet more preferably between 1 and 3 wt %. HPC is preferably included in the adsorptive composite coating between 3 and 10 wt %, more preferably between 5 and 10 wt %, more preferably between 5 and 9 wt %, and yet more preferably between 5 and 8 wt % (all based on total solids content in the adsorptive composite coating). In some embodiments, a further hydrophobic binder can be included, for example methyl cellulose.

Carbon Dioxide Adsorption

In some embodiments, the target gaseous adsorbate is carbon dioxide and the binder is hydrophobic. In these embodiments, the binder preferably comprises at least one siloxane compound. Again, it should be appreciated that the siloxane in the siloxane compound is present either alone or forms an adduct with a cellulose compound. In embodiments, the siloxane compound comprises a siloxane-cellulose polyester or derivative thereof, preferably a cellulose-disiloxane polyester or a cellulose-oligosiloxane polyester. Preferred siloxane compounds include poly (hydroxymethyl) siloxane (PMHS), cellulose methyl siloxane or cellulose amino methyl siloxane. The binder preferably comprises 0.2 to 10 wt % of the at least one siloxane compound.

Again, the binder can comprise or consist of a single binder or a mixture of binder two or more binders. In embodiments, the binder comprises or consists of at least one siloxane compound and at least one additional hydrophobic binder. The at least one additional hydrophobic binder can comprise any suitable hydrophobic binder. In preferred embodiments, the at least one cellulosic polymer is selected from methyl cellulose, amino methyl cellulose, hydroxyl methyl cellulose, hydroxyethyl methylcellulose, ethylhydroxy ethylcellulose, hydroxy propyl cellulose or carboxymethylcellulose. Again, it should be appreciated that the cellulosic polymers can be generally described as:

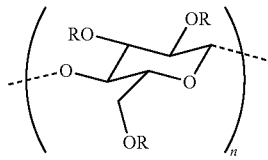

wherein R=H or R=any other C1-C6 alkyl wherein the MW is greater than 250 kDa. For example, R=H or CH$_2$CH(OH)CH$_3$ for HPC with a MW greater than 250 kDa; Similarly, R=H or R=Me for MC with a MW greater than 250 kDa.

In exemplary embodiments, the binder comprises or consists of between 3 and 10 wt % hydroxypropylcellulose and between 0.2 and 10 wt % of a siloxane-cellulose polyester or derivative thereof. For example, the binder may comprise 0.2 to 10 wt % poly (hydroxymethyl) siloxane, 3 to 10 wt % hydroxy propyl cellulose, and 0.2 to 5 wt % methyl cellulose (all wt % based on total solids content in the adsorptive composite coating). In preferred embodiments, the binder comprises 2 to 5% poly (hydroxymethyl) siloxane (PMHS), 6.8% hydroxy propyl cellulose (HPC), and 2.25% methyl cellulose (MC) (all wt % based on total solids content in the adsorptive composite coating). In embodiments, the binder may consist of 0.2 to 10 wt % poly (hydroxymethyl) siloxane, 3 to 10 wt % hydroxy propyl cellulose, and 0.2 to 5 wt % methyl cellulose (all wt % based on total solids content in the adsorptive composite coating). In preferred embodiments, the binder consists of 2 to 5% poly (hydroxymethyl) siloxane (PMHS), 6.8% hydroxy propyl cellulose (HPC), and 2.25% methyl cellulose (MC) (all wt % based on total solids content in the adsorptive composite coating).

Where the adsorptive composite coating is hydrophobic, the composite coating preferably has a contact angle over 70 degrees. It should be understood that the contact angle (also known as wetting angle) is the angle between the surface of the liquid and the outline of the contact surface on the surface of a solid is described as the contact angle θ. The contact angle is a measure of the wettability of a solid by a liquid. The contact angle is measured by Drop shape analysis (DSA) where the contact angle is measured using the image of a sessile drop (typically water) at the points of intersection (three-phase contact points) between the drop contour and the projection of the surface (baseline). Measurement Instruments include: DSA100, DSA30, DSA25 from Krüss GmbH.

Oxygen Adsorption

In some embodiments, the target gaseous adsorbate is oxygen and the binder is hydrophobic. In these embodiments, the binder preferably comprises or consists of at least one of poly (hydroxymethyl) siloxane, cellulose methyl siloxane or cellulose amino methyl siloxane, poly (ethyl vinyl acetate), methyl cellulose or hydroxypropylcellulose.

Other Adsorbates

In some embodiments, the target gaseous adsorbate is at least one of carbon monoxide, hydrogen, argon, methane, neon, and wherein the binder is selected from a hydrophobic or hydrophilic binder. In these embodiments, the binder preferably comprises or consists of at least one of poly (hydroxymethyl) siloxane, cellulose methyl siloxane or cellulose amino methyl siloxane, poly (ethyl vinyl acetate), methyl cellulose, hydroxypropylcellulose, polyvinylpyrrolidone, polyvinyl alcohol or thermo plastic polyurethane.

Preferred hydrophobic binders include poly (hydroxymethyl) siloxane (PMHS) with a molecular weight of 1 to 5 kDa, preferably, 1.7 to 3.2 kDa, cellulose methyl siloxane or cellulose amino methyl siloxane with a molecular weight of 50 kDa to 100 kDa, preferably 86 kDa, poly (ethyl vinyl acetate), methyl cellulose (MC), hydroxypropylcellulose (HPC) with a molecular weight of 250 kDa to 1200 kDa, preferably 1000 kDa.

Preferred hydrophilic binders include polyvinylpyrrolidone (PVP), polyvinyl alcohol (PVA), thermo plastic polyurethane or hydroxypropylcellulose (HPC) with a molecular weight of 1 kDa to 1200 kDa.

Metal-Organic Frameworks

Metal-organic frameworks (MOFs) (also known as Metal-organic Materials (MOMs)) comprise the major adsorbent constituent of the adsorptive composite coating. MOFs are a crystalline nanoadsorbent with exceptional porosity. MOFs are composed of metal ions or clusters coordinated with organic linkers in an open framework to establish an array where each atom forms part of an internal surface. In this structure, every atom is an exposed surface which can be tailored to adsorb gases, vapours, liquids or the like. MOFs as a physisorbent achieve strong adsorption characteristics through the internal surfaces of the MOF porous structure. Advantageously, the surface chemistry and structure of MOFs can be tuned for a specific application, where performance criteria such as adsorption/desorption rate, capacity as a function of pressure, and operating temperature may be of particular importance.

For this functionality, the adsorptive composite coating comprises at least 50 wt % MOF, preferably at least 60 wt % MOF, more preferably at least 70 wt % MOF, yet more preferably at least 75 wt % MOF and yet more preferably at least 80 wt % MOF (all wt % based on total solids content in the adsorptive composite coating). Again, the overall adsorptive composite coating consists of the MOF content and the binder as discussed above (and in some embodiments a trace/ruminant solvent content).

Any suitable metal organic framework can be used in the method, product and apparatus of the present invention. With over 50,000 different MOFs available, there are a wide range of MOF that can be selected based on compliant or complementary chemistry, pore size, surface area, void fraction, open metal sites, ligand functionality and many other characteristics.

It should be appreciated that Metal Organic Frameworks (MOFs) (also known as coordination polymers) or MOFs are a class of hybrid crystal materials where metal ions or small inorganic nano-clusters are linked into one-, two- or three-dimensional networks by multi-functional organic linkers. In this sense, MOF is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions and finally a coordination polymer is a coordination compound with repeating coordination entities extending in one, two, or three dimensions.

MOFs have many appealing features having surface areas of thousands of square meters per gram, extremely low density, interconnected cavities and very narrow porosity distributions. A variety of open micro- and mesoporous structures can be developed, leading to materials with extremely large surface areas.

MOFs used in adsorptive composite coating of the present invention preferably comprise a plurality of metal clusters, each metal cluster including one or more metal ions; and a plurality of charged or neutral multidentate linking ligands connecting adjacent metal clusters. Such MOFs can therefore be more generally defined by the charged or neutral multidentate linking ligands connecting adjacent metal clusters which are used to form each MOF. The MOF precursors can include one or more of the metal cluster or a metallic salt thereof and/or the multidentate linking ligands which form the final MOF.

Each metal cluster preferably includes one or more metal ions. As used herein, the term "cluster" means a moiety containing one or more atoms or ions of one or more metals or metalloids. This definition embraces single atoms or ions and groups of atoms or ions that optionally include ligands or covalently bonded groups. In embodiments, each cluster comprises two or more metal or metalloid ions (hereinafter jointly referred to as "metal ions") and each ligand of the plurality of multidentate ligand includes at least two hetroatoms, for example two or more carboxylates or other charged or neutral ligands. It should be appreciated that in other embodiments each ligand of the plurality of multidentate ligand can include neutral organic linker ligands and no carboxylic acid functions.

In some embodiments, each metal cluster comprises two or more metal ions and each ligand of the plurality of multidentate ligand comprises an organic ligand which is at least bidentate and is selected from the group consisting of formic acid, acetic acid, oxalic acid, propanoic acid, butanedioic acid, (E)-butenedioic acid, benzene-1,4-dicarboxylic acid, benzene-1,3-dicarboxylic acid, benzene-1,3,5-tricarboxylic acid, 2-amino-1,4-benzenedicarboxylic acid, 2-bromo-1,4-benzenedicarboxylic acid, biphenyl-4,4'-dicarboxylic acid, biphenyl-3,3,5,5-tetracarboxylic acid, biphenyl-3,4',5-tricarboxylic acid, 2,5-dihydroxy-1,4-benzenedicarboxylic acid, 1,3,5-tris(4-carboxyphenyl)benzene, (2E, 4E)-hexa-2,4-dienedioic acid, 1,4-naphthalenedicarboxylic acid, pyrene-2,7-dicarboxylic acid, 4,5,9,10-tetrahydropyrene-2,7-dicarboxylic acid, aspartic acid, glutamic acid, adenine, 4,4'-bypiridine, pyrimidine, pyrazine, pyridine-4-carboxylic acid, pyridine-3-carboxylic acid, imidazole, 1H-benzimidazole, 2-methyl-1H-imidazole, and mixtures thereof.

Typically, the metal ion is selected from the group consisting of Group 1 through 16 metals of the IUPAC Periodic Table of the Elements including actinides, and lanthanides, and combinations thereof. Preferably, the metal ion is selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $B^{3+}$, $B^{5+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$ and combinations thereof.

Typically, the cluster has formula $M_mX_n$ where M is the metal ion, X is selected from the group consisting of Group 13 through Group 17 anion, m is an number from 1 to 10, and n is a number selected to charge balance the cluster so that the cluster has a predetermined electric charge Preferably, X is selected from the group consisting of $O^{2-}$, $N^{3-}$ and $S^{2-}$. Preferably, M is selected from the group consisting of $Li^+$, $K^+$, $Na^+$, $Cs^+$, $Mg^{2+}$, $Ca^{2+}$, $Sr^{2+}$, $Ba^{2+}$, $V^{2+}$, $V^{3+}$, $V^{4+}$, $V^{5+}$, $Mn^{2+}$, $Re^{2+}$, $Fe^{2+}$, $Fe^{3+}$, $Ru^{3+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Zn^{2+}$, $Cd^{2+}$, $Hg^{2+}$, $Si^{2+}$, $Ge^{2+}$, $Sn^{2+}$, and $Pb^{2+}$. More preferably M is $Zn^{2+}$ and X is $O^{2-}$.

Typically, the multidentate linking ligand has 6 or more atoms that are incorporated in aromatic rings or non-aromatic rings. Preferably, the multidentate linking ligand has 12 or more atoms that are incorporated in aromatic rings or non-aromatic rings. More preferably, the one or more multidentate linking ligands comprise a ligand selected from the group consisting of ligands having formulae 1 through 27:

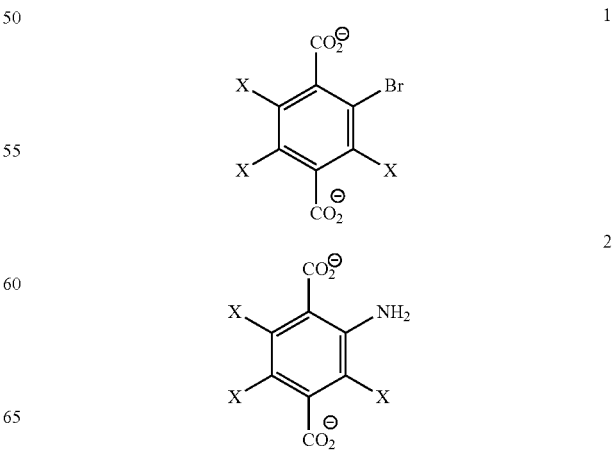

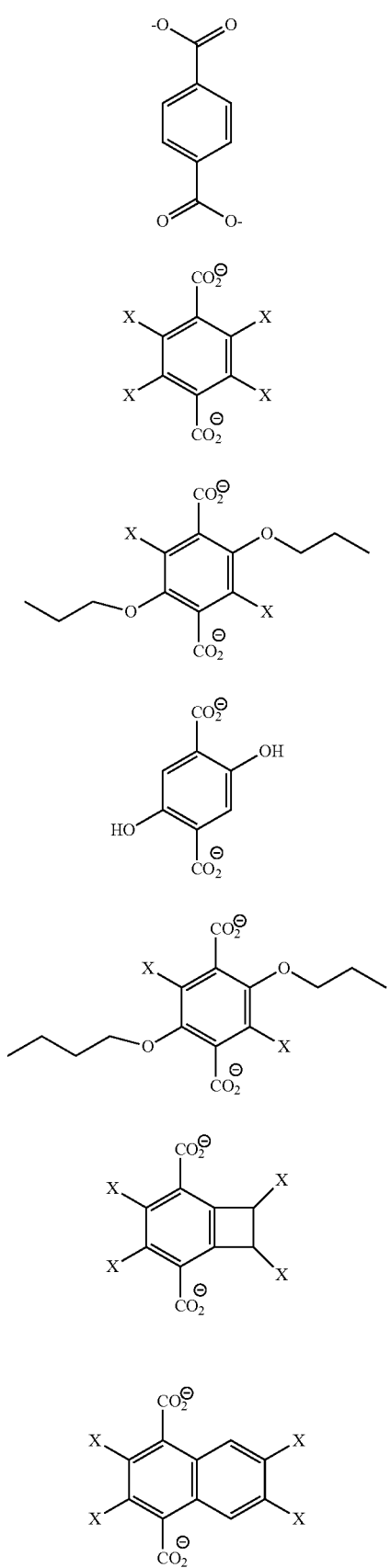
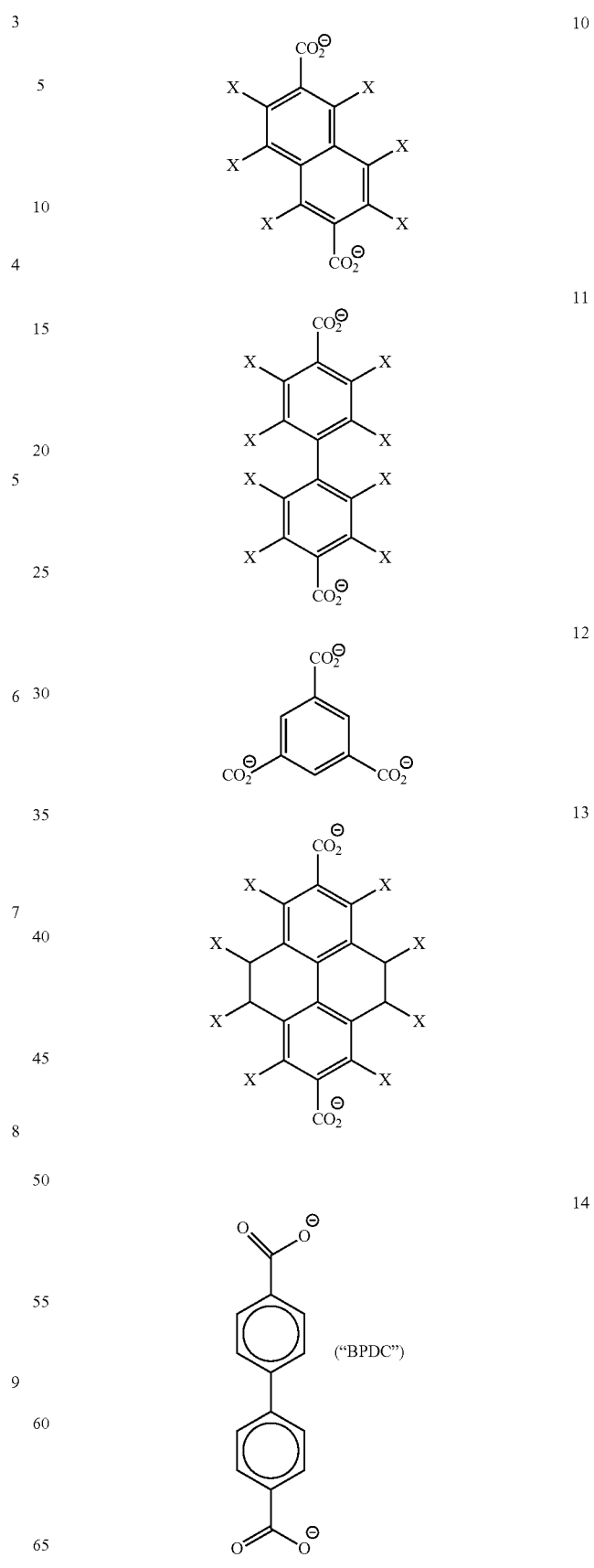

15
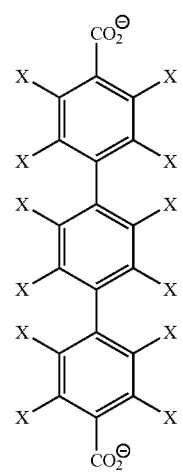
16
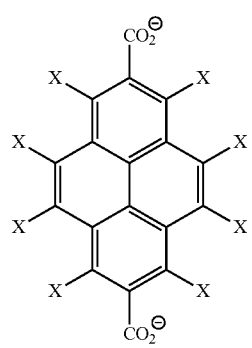
17
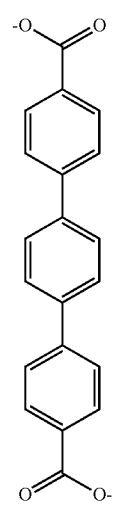
19
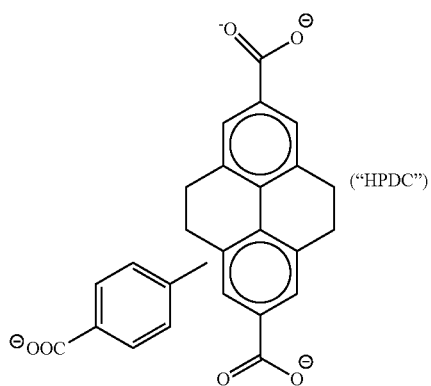
("HPDC")
20
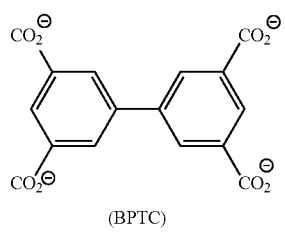
(BPTC)
21
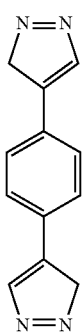
22
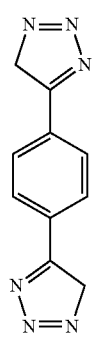

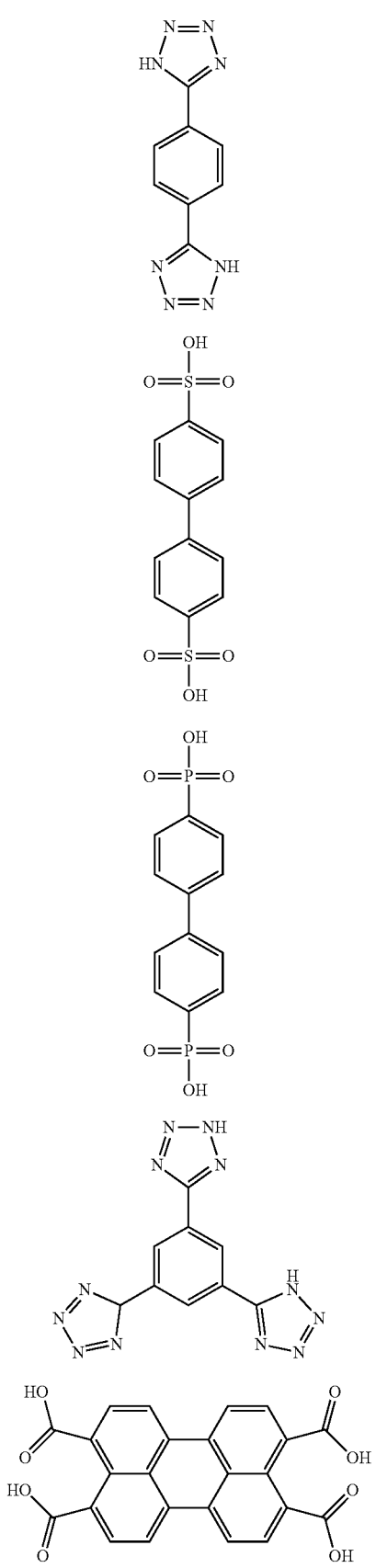

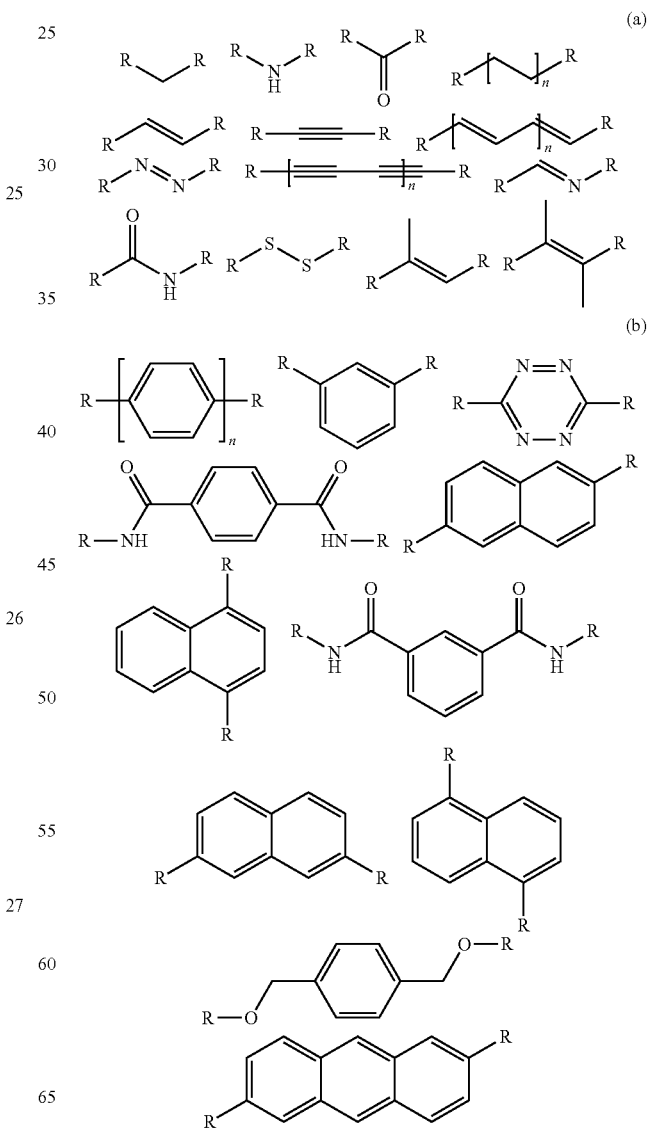

wherein X is hydrogen, —NHR, —N(R)$_2$, halides, C$_{1-10}$ alkyl, C$_{6-18}$ aryl, or C$_{6-18}$ aralkyl, —NH$_2$, alkenyl, alkynyl, —Oalkyl, —NH(aryl), cycloalkyl, cycloalkenyl, cycloalkynyl, —(CO)R, —(SO$_2$)R, —(CO$_2$)R—SH, —S(alkyl), —SO$_3$H, —SO$^{3-}$M$^+$, —COOH, —COO-M$^+$, —PO$_3$H$_2$—, —PO$_3$H$^-$M$^+$, —PO$_3{}^{2-}$M$^{2+}$, —PO$_3{}^{2-}$R$^{2+}$, —NO$_2$, —CO$_2$H, silyl derivatives; borane derivatives; and ferrocenes and other metallocenes; M is a metal atom, and R is C$_{1-10}$ alkyl.

In some embodiments, the multidentate linking ligand comprises a bifunctional, N-donor linker ligands, L, can be divided into two subsets (denoted herein as Subsets I and II). In embodiments, subset I can include linker ligands containing one bridging group (BG) and two N-donor pendant groups (PG). In embodiments, BG may be: 1) a monocyclic or fused-polycyclic aromatic system, 2) non-aromatic, or 3) absent. In embodiments, two PGs can be attached by a covalent bond to each end of the BG. When BG is absent, two PGs can be attached directly to each other via a covalent bond (for example two 4-pyridyl PGs combine to form 4,4'-bipyridine). Examples of these linker ligands include:

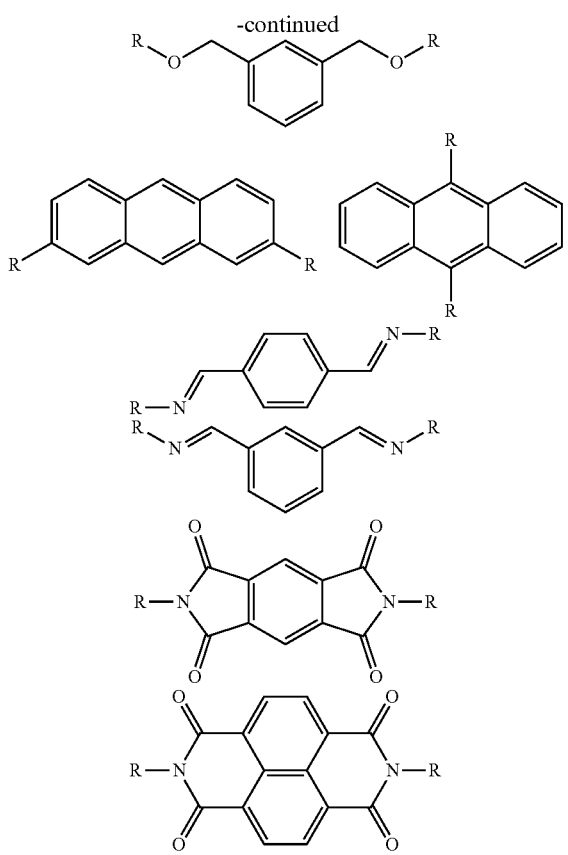

where R comprises a N-donor PGs. Examples of N-donar PGs of ligands of subset I include:

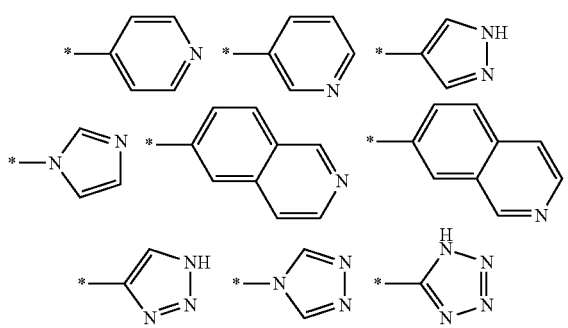

Where "*" comprises the attachment point to the BG.

In embodiments, subset can include linker ligands that contain two coordinating N-donor moieties that are integrated into a single monocyclic or polycyclic aromatic system. Examples of these linker ligands include:

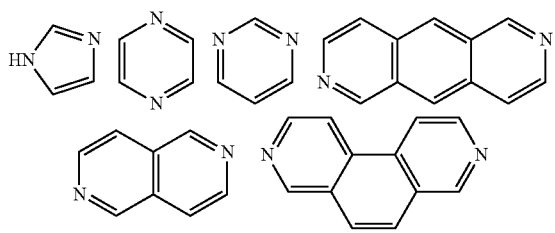

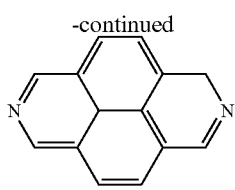

In embodiments, both subset I and subset II, one or more of the hydrogen atoms of L (e.g., BG, LG, etc) can be independently substituted by non-coordinating groups such as halogens, a substituted or unsubstituted aliphatic group, a substituted or unsubstituted alkyl, a substituted or unsubstituted cycloalkyl, a substituted or unsubstituted alkenyl, a substituted or unsubstituted cycloalkenyl, a substituted or unsubstituted alkynyl, a substituted or unsubstituted aryl, a halo group, or a substituted or unsubstituted araalkyl, and functional groups containing carbonyl groups such as esters, amides, aldehydes and ketones, each of which can be substituted or unsubstituted. Preferably, pyrazine based MOFs are suitable for carbon dioxide adsorption by direct air capture.

Examples of metal organic frameworks that may be suitable for use in the present invention include those commonly known in the art as at least one of NOTT-140, MIL-101(Cr), MOF-205, CuBTC (HKUST-1), Mn-MOF-74, UiO66-NH2, MOF-177, SIFSIX-3-Ni, TIFSIX-3-Ni, TIFSIX-2-Cu, aluminium fumarate, MOF-801, MOF-841, $M_2Cl_2BTDD$ including $Co_2Cl_2BTDD$, Cr-soc-MOF-1, MIL-101(Cr), CAU-10, alkali metal ($Li^+$, $Na^+$) doped MIL-101(Cr), MOF-303 (Al), MOF-802, MOF-805, MOF-806, MOF-808, MOF-812, NbOFFIVE-1-Ni or mixtures thereof. However, it should be appreciated that the present invention is suitable for use with a large number of MOFs and should therefore not be limited to the exemplified MOF structures in the present application.

In some embodiments, the metal organic framework comprises aluminium fumarate, SIFSIX-3-Ni, TIFSIX-3-Ni, TIFSIX-2-Cu or CuBTC.

It should be appreciated that where SIFSIX-3-Ni, TIFSIX-3-Ni is formed a non-fluorinated ligand is preferably used to form this MOF. In embodiments, the non-fluorinated ligand comprises ammonia hexafluorotitanate. NiTIFSIX is preferably made with ammonium hexafluorotitanate.

In exemplary embodiments, the metal organic framework is a metal-organic material (MOM) of general formula $[ML_2TIFSIX]_n$, n is 1 to $10^{18}$ wherein M is a divalent or trivalent metal, wherein L is a bifunctional linker molecule based upon two nitrogen donor moieties such as pyrazine; and TIFSIX is hexafluorotitanate, hexafluorostannate or hexafluorosilicate.

In embodiments, M can be a divalent or trivalent metal. In some embodiments, M can be one of the following: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$ and $Co^{3+}$.

In embodiments, the bifunctional, N-donor linker ligands, L, can be divided into two subsets (denoted herein as Subsets I and II) as defined above.

In embodiments, the MOM can be Cu(4,4'-4,4'bipyridine)2(TiF$_6$)]n where n is 1 to $10^{18}$ or [Cu(4,4'-bipyridine)2(SnF$_6$)]n, wherein n is 1 to $10^{18}$. In embodiments, the two-dimensional square grids include metal cations, metal cluster molecular building blocks (MBBs), or metal-organic polyhedral supermolecular building blocks (SBBs). The MBBs or SBBs serve the geometric rc (a) the node in a network and they are connected by organic molecules, inorganic anions and/or metal complexes, which serve as linkers. The two-dimensional square grids are connected to one another using other linkers or pillars that connect to the metal nodes. Suitable examples of MOMs are taught in U.S. Pat. No. 9,504,986 B2, the contents of which should be understood to be incorporated into this specification by this reference.

MOMs suitable for use as metal organic frameworks in the adsorptive composite coating are three-dimensional nets that have a primitive cubic topology and can include a metal organic framework that is based upon square grid networks that are pillared in the third dimension. The MOMs preferably contain no unsaturated metal centres or strong hydrogen bonding sites, they can be used in methods and systems that use gases that include water vapour, which was not previously possible in porous materials that exhibit strong physisorption towards $CO_2$. This is advantageous because other systems and methods that use other MOMs or other porous materials must separate water vapour from the gas prior to the gas being introduced to the other MOMs or porous materials since the other MOMs or porous materials have a higher affinity for the water vapour than $CO_2$. If the water vapour is not removed, the other MOMs are not effective at removing $CO_2$. Embodiments of the systems and methods can be simplified and result in reduced expenditure since the water vapour does not have to be removed prior to introduction to the MOMs. Even in the presence of water vapour, MOMs used in embodiments of the present disclosure are more effective at removing $CO_2$ and are highly selective in separating $CO_2$ from other gases such as $N_2$, $H_2$, and/or $CH_4$.

The concentration of MOF within the adsorptive composite coating is selected to provide a desired adsorptive performance. However, typically the adsorptive composite coating includes from 20 to 100 $g/m^2$ MOF, preferably from 50 to 80 $g/m^2$ MOF. In other embodiments, the adsorptive composite coating includes from 20 to 50 $g/m^2$ MOF, preferably from 30 to 50 $g/m^2$ MOF, more preferably from 30 to 40 $g/m^2$ MOF. In other embodiments, the adsorptive composite coating includes from 30 to 80 $g/m^2$ MOF.

The MOF should preferably embody a number of properties to maximise the functionality of the adsorptive composite coating. For example, the MOF preferably has an average surface area of at least 700 $m^2/g$, and preferably greater than 800 $m^2/g$. The MOF also preferably has a pore size of at least 2 nm, preferably greater than 5 nm. The pore size should be sufficient to at least fit the target adsorbate molecule therein.

In the present invention, the MOF is provided as a powder or particulates, and more preferably as a pulverulent material. In embodiments, the MOF powder has a particle size of less than 500 µm, preferably less than 300 µm, more preferably less than 212 µm, yet more preferably less than 150 µm, and in some embodiments less than 88 µm. It should be appreciated that particle size is typically measured in terms of mesh size through which the particles are sieved. Therefore, in embodiments the MOF powder has a particle size of less than 60 mesh (250 µm), preferably less than 100 mesh (149 µm), preferably less than 140 mesh (105 µm), and more preferably less than 170 mesh (88 µm). The MOF powder preferably also has a mean particle size of between 10 and 100 µm, more preferably between 20 and 80 µm. In other embodiments, the MOF powder has a mean particle size of between 10 and 80 µm, and preferably between 20 and 60 µm.

Substrate Configuration

The adsorptive composite coating of the present invention can be coated on a variety of substrates. The substrate configuration is selected to match the adsorbate properties and adsorptive conditions in a particular adsorption apparatus.

The substrate is preferable flexible. In some embodiments, the substrate can be planar, preferably a planar sheet, for example a flexible sheet. A planar substrate provides a two sided element onto which the adsorptive composite coating can be applied. Each substrate is preferably coated with the adsorptive composite coating on two opposing sides. That planar substrate can have any configuration. In some embodiments, the planar substrate comprises a flat solid surface. In other embodiments, the planar substrate may include one or a number of apertures, designed to assist gas flow through and around the substrate. In particular embodiments, the substrate comprises mesh, preferably micro wire mesh. The use of a mesh provides a multitude of apertures, preferably micro size apertures, thereby providing a high surface area on which the adsorptive composite coating can be applied, whilst also providing a suitable flow path having a reasonably low pressure drop across the substrate (of course relative to the size and configuration of the mesh) compared to other adsorber configurations for example packed beds.

For the purposes of this invention, the terms "micro wire mesh" and "micro wire catalyst" refer to high open area monolith catalyst elements with flow paths so short that reaction rate per unit length per channel is at least fifty percent higher than for the same diameter channel with a fully developed boundary layer in laminar flow, i.e. a flow path of less than about two mm in length, preferably less than one mm or even less than 0.5 mm and having flow channels with a ratio of channel flow length to channel diameter less than about two to one, but preferably less than one to one and more preferably less than about 0.5 to one. Channel diameter is defined as the diameter of the largest circle which will fit within the given flow channel and is preferably less than one mm or more preferably less than 0.5 mm. Micro wire catalysts may be in the form of woven wire screens, pressed metal or ceramic wire screens or even pressed thin ceramic plates and have as many as 100 to 1000 or more flow channels per square centimeter. Flow channels may be of any desired shape. For wire screens, flow channel length is the wire diameter and thus advantageously may be shorter than 0.3 mm or even shorter than 0.1 mm.

The planar substrate can be configured in a variety of configurations. In some embodiments, the planar sheets are used in a flat configuration, typically stacked as a plurality of parallel spaced apart sheets. In other embodiments, the substrate is configured as a spiral rolled sheet, preferably a spiral rolled cylinder.

In further embodiments, the substrate is rigid. The rigid substrate is preferably 3D and porous. It could be a pre-form or made by 3D printing or patterning. Any suitable material could be used. In other embodiments, the substrate comprises a metal, ceramic or polymeric monolith.

The substrate can have a number of other suitable properties. For example, at least part of the substrate can be electrically conductive. In this regard, either a whole or part of the substrate is conductive. In some embodiments, the substrate is comprised from or coated with a resistive heating material. The resistive heating material preferably comprises a non-dielectric material through which a current can flow and having a resistance sufficient to heat the adsorptive composite coating to at least 80° C., preferably between 80 and 150° C. This resistive heating is preferably achieved with a voltage across the substrate of no more than 48 V. Suitable resistive heating material include (but are not limited to) at least one of nichrome, tungsten, carbon fibre, nichrome, tungsten, Kanthal/Fecralloy, Cupronickel, graphite, graphitic material coatings, molybdenum disilicide, PTC ceramic materials, PTC polymer materials or platinum. In some embodiments, the resistive heating material comprises a fiberglass substrate coated in graphite or a graphitic material coating. In some embodiments, the graphitic material can comprise a graphite and carbon composite coating comprising a mixture of graphite, carbon and a polymer binder. Any suitable polymer binder can be used, for example PTFE.

The use of resistive heating material advantageously provides a means of local heat generation in the substrate on the application of a current flow through the resistive heating material. The adsorptive composite coated substrate can therefore be used to adsorb a selected adsorbate species, for example carbon dioxide. When that adsorbate is desired to be released from the adsorptive composite coating, a current can then be passed through the substrate to raise the temperature of the substrate and adsorptive composite coating, to heat the MOF to a suitable temperature to desorb the selected adsorbate therefrom.

The advantages of a resistive heating material are:
1. Local heat generation—i.e. heat can be generated insitu by applying a current to the substrate and/or MOF coating composite as opposed to using an external heating source;
2. Fast heating of material, due to local heat generation avoiding thermal and energy loss through thermal heating of surrounding materials; and
3. High energy conversion efficiency.

Adsorption of a gas or other adsorbate within the pores of the MOF occurs through physical interactions (such as van der Waals and electrostatic forces) or through chemical interactions. In both cases there is a binding energy (characterised by the heat of adsorption) equivalent to the energy required to break the binding between the gas and the MOF, resulting in desorption or release of the adsorbed gas. This energy is supplied using resistive heating of the substrate. The combination of the resistive heating material with a composite MOF based coating to yields an adsorbent with exceptional adsorption behaviour as a result of the MOFs and efficiency of resistive heating.

A conductive and/or resistive heating substrate requires at least one pair of electrodes for applying current flow through the substrate. The substrate can therefore further comprise at least one pair of spaced apart electrodes configured to enable current to flow therebetween and through the resistive heating material. In some embodiments, the electrodes comprise conductive strips positioned at or proximate perimeter locations of the substrate, preferably spaced apart sides of the substrate and the resistive heating material extends between each conductive strip. Where the substrate comprises a flexible sheet and the conductive strips are preferably located at or proximate a longitudinal edge of each flexible sheet. The electrodes can be constructed from any suitable conductive material, for example a conductive metal such as aluminium, brass, gold, copper or the like. In one embodiment, the electrodes are formed from a copper material or a material comprising copper. In one embodiment, the copper material comprises a tinned copper material (copper coated with solder, which it should be appreciated to be an alloy containing tin by itself or in combination with copper, silver, bismuth, indium, zinc, antimony, lead and traces of other metals).

In a further embodiment, the substrate and/or MOF coating composite can be heated using an alternative energy source such as solar energy.

Adsorption Apparatus Configuration

Fluid flow is typically required to move the gaseous feed stream from the inlet, across the at least one adsorption element and out of the housing through the outlet. The at least one adsorption element can be located between the inlet and outlet with the fluid flow flowing between the inlet and outlet and over and in contact with the at least one adsorption element. Such fluid flow is preferably driven by at least one fluid flow device which drives a fluid flow from the inlet to the outlet of the adsorption apparatus. A variety of different fluid flow devices can be used. In embodiments, the fluid flow device comprises at least one fan or pump. In embodiments, the produced a flow rate of through the at least one adsorption element of at least 20 m$^3$/hour, preferably at least 50 m$^3$/hour, more preferably at least 60 m$^3$/hour (1000 L/min). The flow rate through the housing and across the one adsorption element is preferably achieved with substantially no back pressure measurable through/across the adsorption element.

In an alternate form, pressure variance or suction could be used to drive fluid flow through the device.

The desorption arrangement can take any number of forms depending on whether heat and/or reduced pressure is being used to cause the adsorbed gaseous adsorbate to desorb from the adsorptive composite coating. In some embodiments, the apparatus is designed for pressure swing adsorption, with desorption being achieved by reducing the pressure for example using a vacuum pump to evacuate the gas from around the adsorption element. In other embodiments, temperature swing adsorption is undertaken to achieve gaseous adsorbate harvesting from the adsorptive composite coating. This can be achieved using direct heating methods, or in some cases using magnetic induction swing adsorption. The adsorption apparatus of this first aspect of the present invention may therefore include a desorption arrangement that comprises at least one of: a thermal swing desorption arrangement; a pressure swing desorption arrangement; or a magnetic thermal swing desorption system. Where the desorption arrangement comprises a pressure swing desorption arrangement, that arrangement may include at least one vacuum pump for reducing the pressure surrounding the adsorption element. Where the desorption arrangement comprises a temperature swing desorption arrangement, that arrangement may include at least one heating element for increasing the temperature of the adsorptive composite coating of the adsorption element.

The housing can have any suitable configuration. In some embodiments, the housing comprises a cylindrical tube having an inlet at one end and an outlet at the opposite end. In these embodiments, the substrate can be located or otherwise packed within the cylindrical tube in a compacted manner to increase the surface area within that volume.

Packed bed type arrangements are not generally suitable where a large volume of gaseous feed stream needs to flow through the adsorption device, as this type of adsorber configuration has a large pressure drop resulting from the tight packing of the adsorbent particles or pellets therein. A less tightly packed adsorber element arrangement is preferred. In embodiments, the substrate can therefore comprise a planar sheet which is tightly stacked or rolled to provide stacked layers within the housing of the adsorption apparatus. In exemplary embodiments, the substrate of each adsorption element comprises a spiral rolled flexible sheet, preferably a tightly spiral rolled flexible sheet. This tight rolled structure advantageously provides a compact adsorber element that fills a cylindrical housing, whilst still allowing the gaseous feed stream to flow relatively freely (i.e. with not too high a pressure drop) between the inlet and outlet of the housing. This configuration allows for a high flow rate of gas to pass through the housing and across the adsorptive composite coating. This is particularly advantageous when the adsorbate has a low concentration in the gaseous feed stream (for example $CO_2$ in atmospheric air), so to allow a high volume of gas to flow over the adsorptive composite coating without expending significant energy (pumping etc) which would otherwise be needed in arrangements having a relatively higher pressure drop. In some embodiments, the spiral rolled flexible sheet is rolled around a support element, preferably a cylindrical support element. The support element can be formed from any suitable material. In some embodiments the support element is metal, for example aluminium or stainless steel.

The planar sheet is preferably rolled up to provide a packing density of at least 5% volume inside the housing, and preferably about 6% volume of MOF (adsorptive composite coating) over volume of canister. The substrate surface area is preferably at least 1000 $m^2/m^3$, preferably at least 1200 $m^2/m^3$, preferably about 1234 $m^2/m^3$. These properties advantageously achieve the balance between fast capture of $CO_2$ and efficient release. If the packing density is too high then the flow rates cannot be achieved without significant back pressure/energy cost. If the packing density is too low then the desorption purity and efficiency is low. High substrate surface area increases the air-MOF contact rate which increase efficiency of capture.

The adsorptive element (rolled planar sheet) preferably occupies a volume ratio of between 0.5:1 to 2:1 of empty volume:adsorbent element within the housing. Again, sufficient flow area (i.e. the empty volume—the volume in the housing through which gas is able to flow between the inlet and outlet) needs to be left within the housing, and between the layers of the rolled up planar substrate to allow sufficient flow rate to be achieved without significant back pressure/energy cost. In embodiments, the adsorptive element (rolled planar sheet) preferably occupies a volume ratio of between 0.5:1 to 1.5:1 of empty volume:adsorbent element within the housing. Typically, the adsorptive element occupies between 20 to 80% of the volume of the housing, more preferably from 20 to 40%. In embodiments, the volume ratio of empty volume:adsorbent element within the housing is 1.3:1. In these embodiments, the adsorptive element occupies about 42% of the volume of the housing. In comparison, packed bed systems typically occupy around 80% of the volume of the housing (leaving 20% empty space).

In particular embodiments, the substrate of each adsorption element comprises or is coated with a resistive heating material. That substrate also includes at least one pair of spaced apart electrodes electrically connected to the resistive heating material. In such embodiments, the apparatus further includes at least one power source connected to the at least one pair of spaced apart electrodes configured to power resistive heating of the resistive heating material.

This form of the adsorption apparatus of the present invention advantageously combines a resistive heating layer with a thin adsorptive composite coating (MOF containing composite coating). The combination of a resistive heating layer with MOFs allows the generation of heat on application of a current through the resistive heating layer. The MOF in the composite coating can therefore be regenerated using direct and controlled heating, and which in return releases the adsorbed fluid from the pores of the MOF part of the composite coating. The use of a sheet also provides a large surface area across which ambient air can flow, but with a much lower pressure drop compared to a packed bed configuration.

The substrate in these embodiments is also preferably electrically isolated from adjacent substrate sheets. The apparatus can therefore further comprise at least two adsorption elements having substrates comprising flexible sheets, each flexible sheet being separated by an insulating element. The insulating element can have any form and be constructed from any suitable insulative material. In embodiments, the insulating element comprises one or more strips of insulating material extending between adjacent adsorption elements. Preferably, the insulating element comprises an insulating lattice, grid or mesh extending between adjacent adsorption elements. Examples of suitable insulating materials include polymers, for example Teflon.

The apparatus can include a single housing or multiple housings enclosing adsorption elements according to the first aspect of the present invention. Where two or more housings enclosing at least one adsorption element are present, each housing is preferably connected in parallel to the gaseous feed stream. It should be appreciated that the apparatus preferably includes at least three housings enclosing at least one adsorption element in each housing, each housing being preferably connected in parallel to the gaseous feed stream. As detailed below, the adsorption elements in the three housings can be operated in different sections of the adsorption and regeneration cycle to produce a continuous flow of the product adsorbate gas.

The product flow gas from the outlet can flow to a variety of secondary processes. For example, for carbon dioxide capture, the adsorption apparatus of the present invention can be integrated with a liquefier and/or dry ice pelletiser to provide dry ice on-demand.

The adsorption apparatus of the present invention is advantageously is compact and can be located much closer to end users, thereby allowing disruptive supply opportunities and better customer value.

Method of Capturing a Gaseous Adsorbate

A second aspect of the present invention provides a method of capturing a gaseous adsorbate from a gaseous feed stream comprising at least one cycle of:
 flowing a gaseous feed stream over (i.e. in contact with) at least one adsorption element enclosed within the housing, the at least one adsorption element comprising at least one substrate coated with an adsorptive composite coating that comprises or consists of at least 50 wt % metal organic framework and a binder, the binder including at least one hydrophobic binder, such that the adsorptive composite coating adsorbs a selected gaseous adsorbate from the gaseous feed stream; and
 operating at least one desorption arrangement to heat, apply a reduced pressure or a combination thereof to the adsorptive composite coating so to release at least a portion of the adsorbed gaseous adsorbate therefrom, thereby producing a gaseous product flow including the gaseous adsorbate, wherein the gaseous feed stream comprises atmospheric air based gaseous feed stream.

In this second aspect of the present invention, a gaseous feed stream containing a content of the desired adsorbate is fed into adsorptive contact with an adsorptive composite coating as described in relation to the first aspect of the present invention. After the adsorptive composite coating is charged with an amount of the target adsorbate the desorption arrangement is activated forcing at least a portion of the adsorbate to be released from the adsorptive composite coating. The desorbed adsorbate can be collected using a secondary process designed for that specific adsorbate.

It should be appreciated that the method of the second aspect of the present invention can be performed using the apparatus of the first aspect of the present invention. The above disclosure of the first aspect of the present invention therefore equally applies to the features of this second aspect of the present invention.

The inventive method is a cyclical method, where the steps of adsorbing the adsorbate in the adsorptive composite coating of the adsorption element and releasing that adsorbate through operation of the at least one desorption arrangement in a repetitive cycle so to continuously produce the adsorbate. The cycle time typically depends on configuration of the adsorption apparatus, the configuration of the adsorption element, the type of desorption arrangement, the composition of the adsorptive composite coating, breakthrough point, saturation point and characteristics of the particular adsorptive composite coating, temperature, pressure and other process conditions. In some embodiments, the cycle time of these method steps are approximately 30 minutes in duration. However, other cycle times between 10 minutes to 2 hours could be possible depending on the configuration of the apparatus and adsorptive composite coating and process conditions. In some embodiments, each cycle is from 10 to 50 minutes, preferably 10 to 30 minutes.

Again, the desorption arrangement can take any number of forms depending on whether heat and/or reduced pressure is being used to cause the adsorbed gaseous adsorbate to desorb from the adsorptive composite coating. In some embodiments, the apparatus is designed for pressure swing adsorption, with desorption being achieved by reducing the pressure for example using a vacuum pump to evacuate the gas from around the adsorption element. In other embodiments, temperature swing adsorption is undertaken to achieve gaseous adsorbate harvesting from the adsorptive composite coating. This can be achieved using direct heating methods, or in some cases using magnetic induction swing adsorption.

In a number of embodiments, the desorption arrangement comprises a temperature swing adsorption arrangement where the adsorptive composite coating is heated. In these embodiments, operating at least one desorption arrangement heats the adsorptive composite coating to a temperature of between 60 to 150° C., preferably between 60 and 90° C., more preferably between 70 and 80° C. and yet more preferably about 70° C.

Heating the adsorptive composite coating can be achieved using a variety of heating means. In some embodiments, a radiant heater is used to heat the adsorptive composite coating. In other embodiments, a heat exchanger setup, for example where the heat is fed in by a fluid such as hot water or gas can be used to heat the adsorptive composite coating. In other embodiments, a resistive heating element is provided in or around the adsorption element to heat the adsorptive composite coating. In particular embodiments, the substrate of each adsorption element comprises or is coated with at a resistive heating material. That substrate also includes at least one pair of spaced apart electrodes electrically connected to the resistive heating material. In such embodiments, the apparatus further includes at least one power source connected to the at least one pair of spaced apart electrodes configured to power resistive heating of the resistive heating material. In such embodiments, the heating step comprises applying electrical energy through the spaced apart electrodes, thereby generating heat within resistive heating material.

Where a resistive heating material is used, the application of electrical energy preferably provides heat energy from 1 to 30 MJ/kg to the adsorptive composite coating, preferably heat energy from 6 to 10 MJ/kg to the adsorptive composite coating. Electrical energy is preferably applied through the spaced apart electrodes in at least one of a single burst, repeated pulses or a varying waveform for at least 5 minutes. In embodiments, the electrical energy is applied with a current density of 0.3 to 2 A/m$^2$ and a voltage of between 6 and 690 V, preferably 48 to 250 V. The electrical energy may be supplied as an alternating or as a direct current with any waveform and any frequency. The waveform of the electrical energy can have any suitable form and frequency. In some embodiments, the waveform of the applied electrical energy has a frequency between zero time variation and 60 Hz.

The heating step may also include the application of a reduced pressure of less than 500 mbar, preferably less than 100 mbar, more preferably less than 50 mbar, more preferably less than 35 mbar. In some embodiments, the heating step also includes flushing the housing with an inert gas, preferably helium, nitrogen or carbon dioxide. An inert gas is used to ensure all air is removed from the empty space in the housing (thus prevent contamination and dilution of the adsorbate when desorbing from the MOF), and to assist removal of the adsorbate from the pores of the MOF.

The apparatus is preferably configured for a large volume of gas to flow therethrough to contact the adsorptive composite coating with a high volume (high volumetric flowrate) of the gaseous feed stream. This is necessary for atmospheric air, as the adsorbate species (for example carbon dioxide) typically has a low concentration in that air. For example, where the feed gas is atmospheric air, the adsorbate can be at least one of hydrogen, oxygen, argon, carbon dioxide, carbon monoxide, neon, or methane, preferably carbon dioxide or other species as detailed above. The gaseous feed stream preferably flows through the at least one adsorption element at a flow rate of at least 20 m$^3$/hour, preferably at least 50 m$^3$/hour, more preferably at least 60 m$^3$/hour (1000 L/min). While the flow rates provided above are suitable for carbon dioxide capture from atmospheric air, lower flow rates could be used for capture of gases present in higher concentrations.

Again, a hydrophobic binder is used in the adsorptive composite coating where competitive water adsorption is to be avoided. The hydrophobic binder content is used to impart hydrophobicity to the adsorptive composite coating to discourage that coating from adsorbing any water content of the gaseous feed stream. In is preferred that where the gaseous feed stream has an input water content and after passing over the at least one adsorption element has an output water content of at least 50% of the input water content, preferably at least 60% of the input water content, more preferably at least 75% of the input water content, yet more preferably at least 90% of the input water content, and even more preferably at least 95% of the input water content. The inventive apparatus and method aims for the at least one adsorption element to not adsorb any water content from the gaseous feed stream, and thus have an output water content of 100% of the input water content of the gaseous feed stream.

A number of MOFs, for example $NiTiF_6$ and $NiSiF_6$ absorb water when at equilibrium. Accordingly, where moisture is an issue (again for example atmospheric air), adsorption can be run in non-equilibrium conditions, and preferably well away from equilibrium conditions in order to minimise the adsorption of water within the system. These conditions are such that the target adsorbate is preferentially adsorbed over the other components based on kinetic properties so that the target adsorbate is able to be adsorbed effectively while non-target components do not have sufficient time to effectively adsorb. Furthermore, this method reduces the concentration of the non-target component at the adsorptive surface, thereby greatly increasing the efficiency of the adsorption of the target adsorbate. Non equilibrium conditions are set empirically by fine-tuning the flow-rate of the gas such that $H_2O$ adsorption is minimised, and $CO_2$ adsorption is maximised. The faster the gas flows the better the selectivity for $CO_2$ with trade off on $CO_2$ adsorption efficiency and energy cost.

It should be appreciated that the gaseous feed stream may undergoe at least one pre-conditioning process before passing over and in adsorptive contact with the at least one adsorption element. In some embodiments, the gaseous feed stream is undergoes at least one drying process prior to passing over (and in adsorptive contact with) the at least one adsorption element. This drying process removes a content of the atmospheric air, drying the air before passing over the adsorption element. In some embodiments, the gaseous feed stream is undergoes at least one cooling process prior to passing over (and in adsorptive contact with) the at least one adsorption element. Other precondition processes such as filtration to remove solid particles entrained in the gaseous feed stream may also be used to reduce fouling and/or wear in the system/apparatus. It should be appreciated that the apparatus of the first aspect of the present invention would include a preconditioning unit, for example a drying unit, to accomplish the preconditioning step.

Direct Air Capture (DAC) Product

One particular application of the apparatus and method of the present invention is a direct air capture (DAC) of $CO_2$ from air, preferably ambient air (i.e. a $CO_2$ Generator). Where the target gaseous adsorbate is $CO_2$ from air, said air preferably comprises less than 500 ppm of $CO_2$. In some embodiments, said air comprising less than 500 ppm of $CO_2$ and $H_2O$ concentrations of at least 1000 ppm. In these embodiments, the selectivity for $CO_2$ is preferably greater than 50%, more preferably greater than 80%.

A further application of the apparatus and method of the present invention is a direct air capture (DAC) of $O_2$, $N_2$ or a targeted gas from ambient air or flue gas or natural gas. For example, the present invention can be used to capture $CO_2$ from flue gas or natural gas. Alternatively, the present invention can be used to capture methane from natural gas allowing the isolation of a pure methane gas. Similarly, the present invention can be used in toxic environments to isolate or purify a selected gas from a gaseous mixture. That selected gas could be one of $CO_2$, CO, NOx (oxides of nitrogen—NO, $N_2O$, $NO_2$, $N_2O_3$, $NO_3$), $SO_2$, $H_2S$, HCN, $Cl_2$, ClO, ClCN, HCl, $NH_3$, amines, HCN, mercaptans, COS (carbonyl sulfide), VOCs (BTX, benzene-toluene-xylene, pyridine, hexane, other), formaldehyde, cyclohexane, GB (Sarin), chloropicrin, methylbromide, ethylene oxide, dichloromethane, HCN, phosphine, phosgene, or formaldehyde. In other embodiments, the adsorbate may comprise oxygen. The capture oxygen might, for example be adsorbed from outside air and added to indoor air. In other embodiments, the adsorbate may comprise oxygen, $CO_2$ or water which might be adsorbed from air in varying amounts to provide a nitrogen like inert gas feed for things that are sensitive to the presence of humidity, oxygen or $CO_2$.

BRIEF DESCRIPTION OF THE DRAWINGS

The present invention will now be described with reference to the Figures of the accompanying drawings, which illustrate particular preferred embodiments of the present invention, wherein.

DETAILED DESCRIPTION

The present invention provides an alternate MOF based adsorption apparatus incorporating a MOF based adsorption element, and an associated adsorption method.

Adsorption Apparatus

Figure 1:
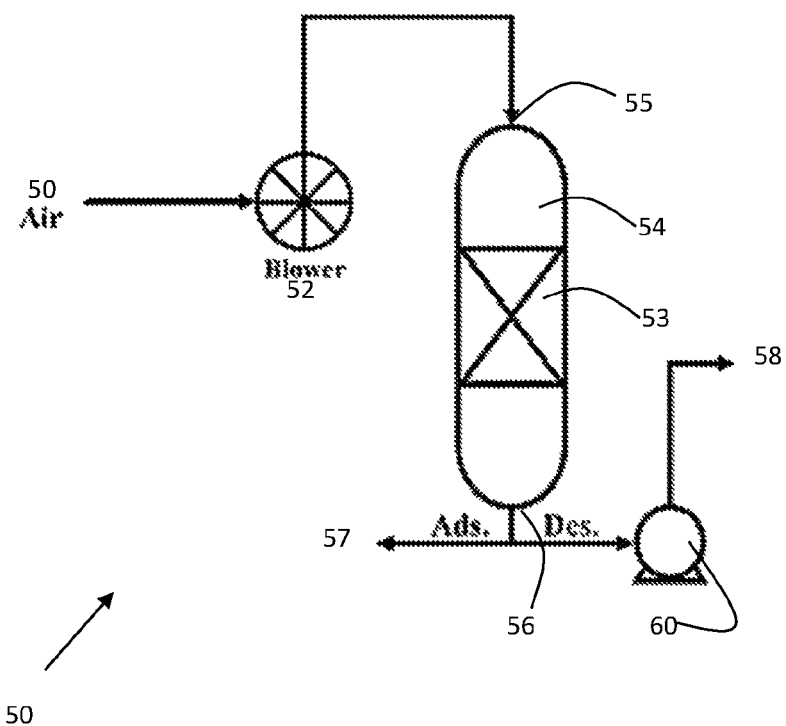
FIG. 1 provides a schematic representation of the adsorption apparatus including a single adsorption chamber, blower, and vacuum pump according to one embodiment of the present invention.

FIG. 1 illustrates a schematic arrangement of an adsorption apparatus 50 according to one embodiment of the present invention. The adsorption apparatus 50 is designed to capture and release an atmospheric gas, such as hydrogen, oxygen, argon, carbon dioxide, carbon monoxide, neon, or methane, from an atmospheric air based gaseous feed stream using a MOF based nanocomposite adsorption element (described in more detail below). As shown in FIG. 1, a single $CO_2$ adsorption module comprises of three major units: a blower 52, an adsorption chamber 54 including adsorption element 53, and a vacuum pump 60.

The adsorption chamber 54 comprises a housing enclosing an adsorption element 53 comprising at least one substrate coated with an adsorptive composite coating that comprises at least 50 wt % metal organic framework and at least one hydrophobic binder (described in more detail below). The adsorption chamber 54 includes an inlet 55 through which feed atmospheric gas 50 can flow to the adsorption element 53 and an outlet 56 through which gas can flow out from the housing. The outlet has is either expelled through the outlet as the adsorbate stripped gas 57 during the adsorption phase of the cycle, or the target adsorbate gas 58 during the desorption phase of the adsorption-desorption cycle (see below for more details on this cycle). The adsorption element 53 is located in the adsorption chamber 54 between the inlet and outlet of the adsorption chamber 54. As will be explained in more detail below, the configuration of the adsorption chamber 54 and the adsorption element 53 and a composite coating thereof is designed to ensure optimum mixing of the feed air with the composite coating of the adsorption element 53 thereby ensuring efficient stripping of the adsorbate from the feed air.

Whilst not specifically illustrated in FIG. 1, the adsorption chamber 54 also includes a desorption arrangement in contact with and/or surrounding the at least one adsorption element 53 used to activate the desorption phase of the adsorption-desorption cycle. In general terms, the desorption arrangement is selectively operable between (i) a deactivated state, and (ii) an activated state in which the arrangement is configured to apply heat, a reduced pressure or a combination thereof to the adsorptive composite coating to desorb at least a portion of the adsorbed gaseous adsorbate from the adsorptive composite coating.

The desorption arrangement can take any number of forms depending on whether heat and/or reduced pressure is being used to cause the adsorbed adsorbate gas to desorb from the adsorbent composite coating. In some embodiments, the apparatus is designed for pressure swing adsorption, with desorption being achieved by reducing the pressure for example using a vacuum pump to evacuate the gas from around the adsorption element. Adsorption would typically be undertaken at near atmospheric pressure. In other embodiments, temperature swing adsorption is undertaken to achieve gas adsorbate harvesting. This can be achieved using direct heating methods, or in some cases using magnetic induction swing adsorption. As will be explained in more detailed below, the exemplary form of the desorption arrangement is a resistive heating material that is in operative contact (direct or forms part of) the adsorption element 53.

The inlet 55 of adsorption chamber 54 is connected to air blower 52 which serves to blow the atmospheric air feed into the adsorption chamber 54. These blowers 52 preferably comprise low cost and energy efficient blowers to allow a high volume of air to be processed without incurring a back-pressure penalty or reduced performance. These types of blowers 52 can generate flow rates up to 50 $m^3h^{-1}$ with a back pressure less than 100 Pa.

The outlet 56 is connected to vacuum pump 60 which is initially used after the adsorption step to remove excess air from within the adsorption chamber 54. During the desorption phase, the vacuum pump 60 is used to creates the driving force that drains the liberated adsorbate gas from the adsorption chamber 54 after the target regeneration temperature is achieved.

Adsorption Element

Figure 2:
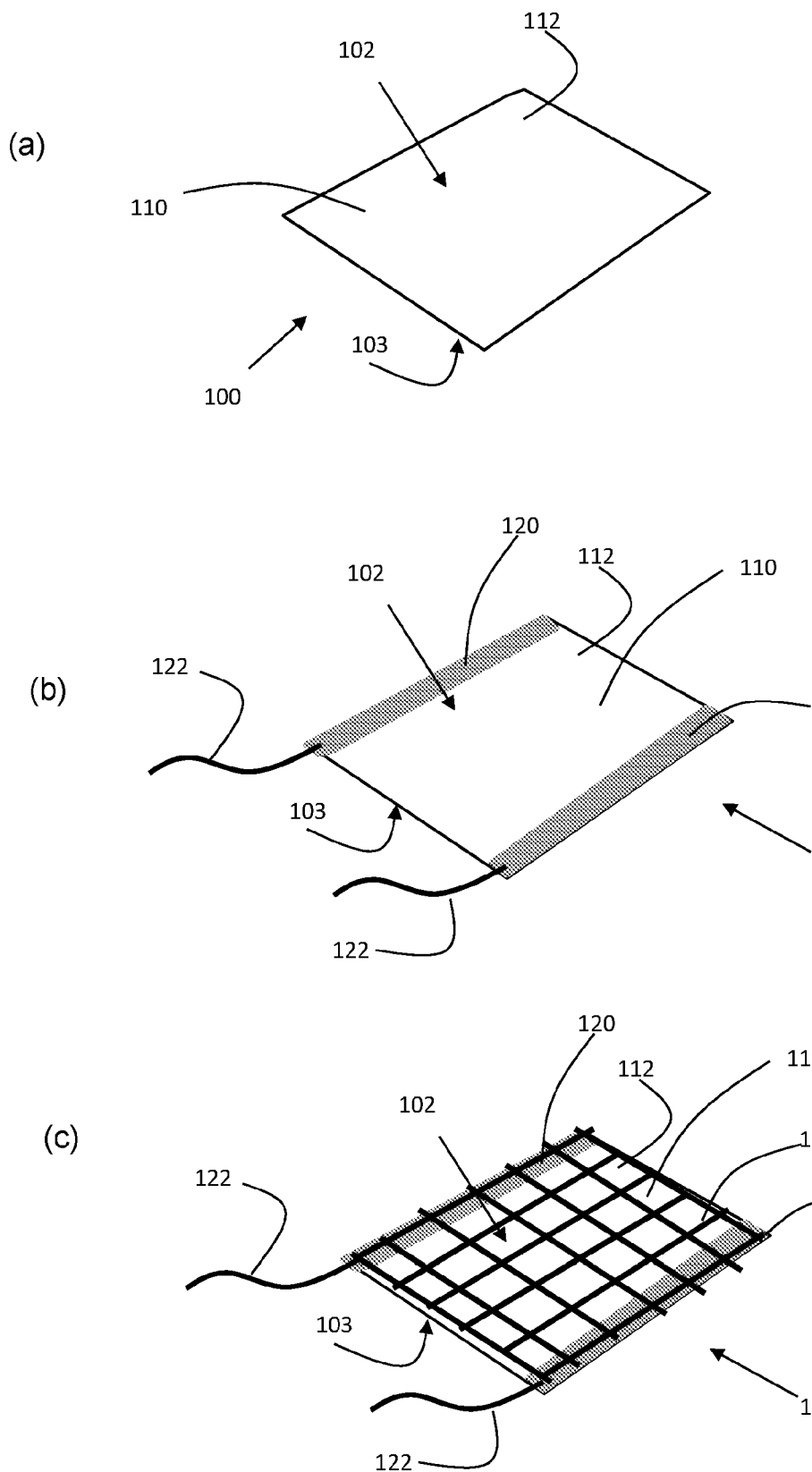
FIG. 2 illustrates one embodiment of the adsorption element according to the present invention, showing (a) a sheet form of the substrate; (b) the sheet form with spaced apart electrodes attached; and (c) the sheet form with an insulative grid seated thereon prior to rolling.

FIG. 2 illustrates one embodiment of the adsorption element 100 that can be used in the adsorption chamber 54. As shown in FIG. 2, the adsorption element 100 comprises a flexible planar sheet 110 coated on both sides 102, 103 with an adsorptive composite coating 112 comprising at least 50 wt % metal organic framework (MOF) and a binder (typically at least 1 wt % binder). Whilst not illustrated, the adsorptive composite coating 112 is thin (in this case understood to be less than 200 µm).

The thickness is selected to be less than 200 µm, preferably less than 100 µm because if the coating is too thick, the adsorbate will not have time to diffuse into the MOF and be adsorbed before it leaves the adsorption apparatus. A large content of the MOF in the coating would not be properly utilised. The coating should preferably be thicker than 30 µm, preferably thicker than 40 µm, as any thinner and the overall efficiency is not high enough as there is not enough MOF on the adsorption element.

Metal Organic Framework/Materials

The metal organic framework in the adsorptive composite coating 112 (FIG. 2) can be selected from a range of suitable MOFs as discussed above. Those MOFs are generally selected based on a number of considerations, including:

1) Stability—the MOF should be stable in the adsorption conditions and for the particular adsorbate. For example, only carbon dioxide stable MOFs should be used for carbon dioxide adsorption.

2) Adsorption reproducibility, the MOF should retain adsorption capacity after multiple adsorption/desorption cycles, preferably at least 10 cycles, more preferably at least 100 cycles.
3) Ease of production, the MOF is preferably easy to produce from readily available precursor materials.
4) High adsorbate uptake even at low concentrations.
5) A good affinity for the adsorbate. The MOF should have a good enough affinity for adsorbate to enable the MOF to adsorb the adsorbate, but not have too high affinity for the adsorbate that excessive energy needs to be expended to desorb the adsorbate therefrom. Here the thermodynamics of the adsorbate species adsorption and desorption need consideration to ensure the MOF does not require excessive energy (kJ/mol MOF) to desorb the adsorbate therefrom, and thereby adversely affect the energy efficiency of the system.

For $CO_2$, the energy/heat required to desorb $CO_2$ from a MOF is a measure of the binding strength between $CO_2$ and the MOF surface. This energy can also depend on the amount of $CO_2$ remaining in the MOF. For example, the very first $CO_2$ molecules to adsorbed within the metal-organic framework $Mg_2$(dobdc) generate around 42 kJ/mol of heat while the last $CO_2$ molecules to adsorb generate around 24 kJ/mol. This is because $Mg_2$(dobdc) comprises of open metal-sites that interact strongly with $CO_2$. Once these metal-$CO_2$ sites are saturated, additional adsorption occurs via $CO_2$—$CO_2$ interactions that are weaker, corresponding to lower heat generation. In other cases, such as for MOF-177 there is a uniform distribution of adsorption sites resulting in a uniform generation of heat during adsorption at around 14 kJ/mol. For comparison, liquid $CO_2$ evaporates into the gaseous phase with a change of enthalpy of around 8 kJ/mol.

Where the MOF is required for production of materials for human consumption (for example water), the MOF and other materials must also meet food for human consumption regulations in relevant countries.

Binder Selection

The selection of the appropriate binder is also important to the overall properties of the adsorptive composite coating. For example, for carbon dioxide and oxygen adsorption, the inventors have found that the binder or binder mixture must include at least one hydrophobic binder to reduce/decrease the competing water adsorption properties of the adsorptive composite coating. It should be appreciated that use of a hydrophobic binder allows water adsorption to be slowed, such that where the feed gas is atmospheric air, atmospheric moisture largely blows across the adsorptive coating while the adsorbate, for example $CO_2$, diffuses in. For other gases a hydrophobic or hydrophilic binder can be used (as previously discussed).

In the coating system of the present invention (see below) the binders thicken the slurry, keep it homogeneous, stabilise the wet coat and provide some adhesion to the substrate. On drying the binder/binder mixture provides adhesion both between the particles (within the coating—provides strength) and between the coating and the substrate (provides adhesion). It should again be appreciated that a variety of binders or mixture of binders could be used as described in detail previously.

As indicated in the following examples, one exemplary hydrophilic binder is a mixture of hydroxypropylcellulose (HPC) and a siloxane compound, typically a cellulose based siloxane compound (referred to as cellulose siloxane at some points of the specification).

HPC is used for processability and strength, and tends to provide good substrate adhesion properties. HPC is also a relatively hydrophobic example of a cellulosic binder—e.g. compared to CMC (Carboxymethylcellulose). In addition, adding cellulosic binders (starch, carboxymethyl cellulose, HPC, methylcellulose) to a slurry of small charged particles such as MOFs, clays, alumina improves the rheology of the resulting mixture such that it flows well under shear forces during coating but sets or gels into a stable film when the physical coating process ends.

The other component, a siloxane compound can be cellulose-disiloxane polyester or a cellulose-oligosiloxane polyester binder. Examples include poly (hydroxymethyl) siloxane, cellulose methyl siloxane or cellulose amino methyl siloxane. Each of these siloxane compounds have a polar-non-polar structure (as discussed above) that is thought to assist in two functions, with the polar structure (for example siloxane component) bonds/packs with the MOF in a manner that creates a 3D porous structure in the coating forming a gas permeable structure in the coating layer, and the non-polar structure provides the required hydrophobicity. In this sense, the siloxane part of this form of composite coating is thought to present a hydrophobic/$CO_2$ permeable surface to the adsorbate air flow repelling water and preventing it from displacing $CO_2$ in the 3D MOF structure. Moreover, the siloxane has a pronounced hydrophobicity. Nevertheless, HPC is also used in this exemplary mixture as it has good broad-spectrum properties but also its improved adhesive properties with respect to cellulose siloxane.

Binder Content

The amount of binder used in a system should also be optimised. A minimum amount of binder should be used for each particular MOF to enable the particle comprising the adsorptive composite coating to bind together when formed. However, too much binder should also be avoided as excess binder decreases the adsorption performance of the adsorptive composite coating. The lower the binder content, the lower the likelihood of pore occlusion induced by the binder.

The minimum and maximum amount of binder depends on a number of factors, including the MOF used in the adsorptive composite coating. Generally, the adsorptive composite coating preferably comprises a MOF:Binder ratio of 7.8:1 to 200:1 based on total wt % of solids in the coating, preferably, 7.9:1. The adsorptive composite coating preferably comprises 80 to 97% MOF. It should be appreciated that the amount of binder is selected based on the properties and particle size (mean size and particle distribution) of the MOF particles, the binding properties of the particular binder and the required properties of the resultant composite coating.

Solvent

The adsorptive composite coating 112 is applied to the planar sheet 110 in a coating process where a slurry is formed from a powder mixture of at least 10 wt % metal organic framework (solvent wt % basis); and at least one binder (a single binder or a mixture of different binders) in a solvent, which is then coated into the planar sheet 110 and dried using a heating technique to form the adsorptive composite coated element 100. Again, the amount of binder added depends on the amount of binder is selected based on the properties and particle size (mean size and particle distribution) of the MOF particles, the binding properties of the particular binder and the required properties of the resultant composite coating. However, the amount of binder is typically at least 0.5 wt %, and more typically from 1 to 10 wt % (solvent wt % basis). The slurry typically has a viscosity of 200 to 1000 cP.

The composite powder mixture is added to the solvent to enable the powder mixture to be formed into a slurry suitable for the coating step. Suitable solvents are preferably selected from a non-basic polar solvent and/or a non-self ionising polar solvent. The solvent preferably comprises an alcohol, such as methanol, ethanol, C2-C9 alcohols including their branched isomers, or water, more preferably deionised water. In some embodiments, the solvent comprises a mixture of a C2 to C9 alcohol and water, preferably deionised water. The solvent typically has an evaporation temperature of less than 150° C., preferably less than 120° C., more preferably less than 100° C.

The composite slurry can be coated onto the flexible sheet using a variety of processes. In embodiments, the composite slurry is coated onto the substrate by rolling, blade coating, dip coating, spray coating, slip coating, waterfall coating and vacuum dosing (precision coating). In a preferred embodiment, the planar sheet 110 is blade cast with the composite slurry in an inert atmosphere to protect the MOF from any premature degradation.

Following the coating process, the composite coating is heated at a temperature of between 60 to 150° C., preferably between 60 and 90° C. for sufficient time to remove the solvent from the composite coating. The heating step can also be conducted in an insert gas atmosphere, for example nitrogen, helium or argon.

Following coating, the adsorptive composite coated planar sheet is then coiled up and the electrical connections made (as detailed below). This is typically done very quickly to minimise air exposure. The rolled adsorption element 110A is then inserted and sealed in an adsorption apparatus 200 (described in more detail below).

An activation step is then undertaken after application of the composite coating 112 to the planar sheet 110. Activation is the removal of solvents of synthesis to leave the exposed pores within the MOFs for the direct air capture. In some embodiments, this is achieved by applying heat and vacuum. In other embodiments, particularly MOF having extremely small pores, activation can be achieved using a method of flowing the adsorptive composite coated substrate through helium gas to expunge the solvents and activate the MOF. For TIFSIX MOF based adsorptive composite coatings, the activation step preferably comprises locating the adsorptive coated substrate in a helium, gas flow at a temperature of at least 800° C., preferably around 100° C. for at least 1 hour, preferably at least 5 hours, more preferably around 24 hours.

Resistive Heating Mesh

A major factor that contributes to the cost of direct air capture is the amount of energy required to liberate the captured adsorbate, for example $CO_2$. To overcome this challenge, the adsorption element includes a resistive heating material for the regeneration phase of the adsorption-desorption cycle. Experiments (see Example 3) revealed an optimum desorption temperature of 80° C. The heating rate is controlled by the voltage range between 20-120 V. As shown in FIG. 11(a), the target regeneration temperature of 80° C. can be achieved within 5 minutes.

Whilst not illustrated in detail in the Figures, the planar sheet 110 comprises mesh, and in this case micro wire mesh. In the illustrated Figures, this comprises a fibreglass mesh sheet. The use of a mesh provides a multitude of apertures, preferably micro size apertures, thereby providing a high surface area on which the adsorptive composite coating can be applied, whilst also providing a suitable flow path having a reasonably low pressure drop across the substrate (of course relative to the size and configuration of the mesh) compared to other adsorber configurations for example packed beds. The mesh comprises a woven wire screens, or pressed metal wire screens with 100 to 1000 or more flow channels per square centimeter.

The planar sheet 110 is coated with a resistive heating material. However, it should be appreciated that in other embodiments, the planar sheet 110 may be formed from a resistive heating material. As discussed previously, the use of resistive heating material advantageously provides a means of local heat generation in the substrate on the application of a current flow through the resistive heating material. Suitable resistive heating material that the mesh can be formed from include (but are not limited to) at least one of nichrome, tungsten, Kanthal/Fecralloy, Cupronickel, carbon fibre, graphite, fibreglass coated with graphitic materials, molybdenum disilicide, PTC ceramic materials, PTC polymer materials or platinum. Suitable resistive heating coating material includes (but is not limited to) graphite or graphitic materials such as a carbon and graphite composite mixture, typically a mixture of graphite and carbon bound together with a binder, typically a polymer binder such as PTFE.

Figure 4:
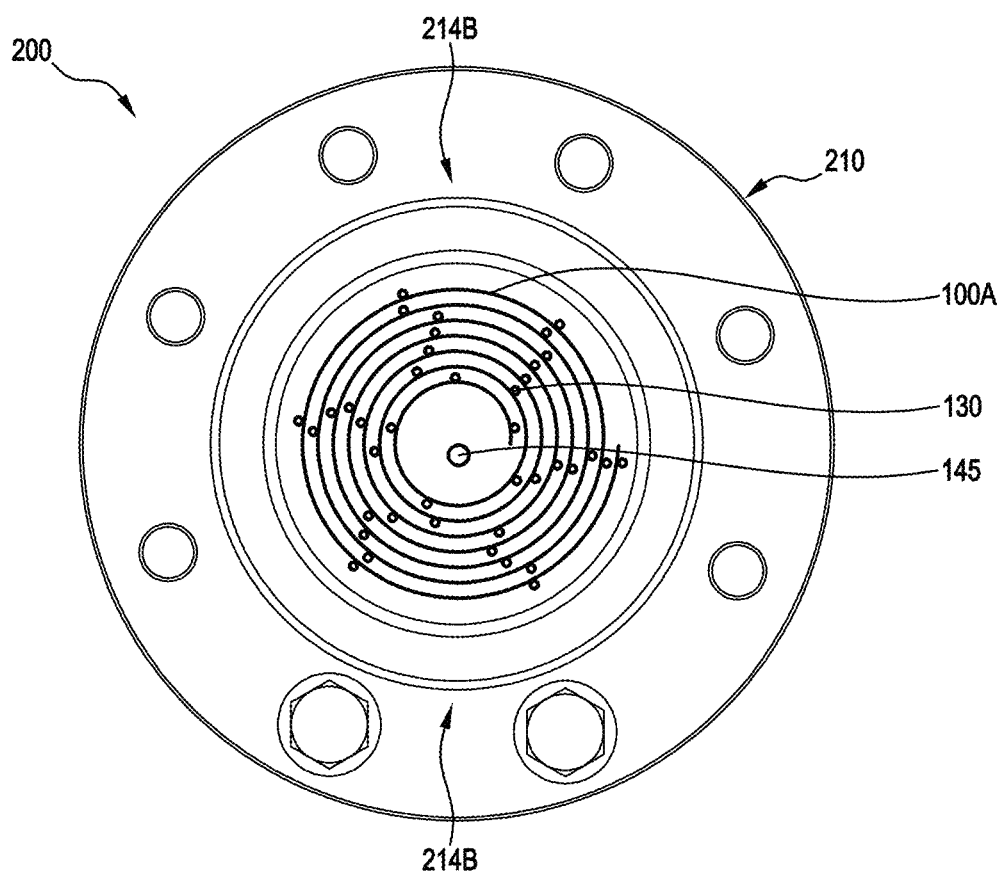
FIG. 4A provides a photograph of the rolled adsorption element shown in FIG. 3 housed in the outlet of a cylindrical housing of an adsorption apparatus according to one embodiment of the present invention.
FIG. 4B provides a photograph of a sheet form of the substrate shown in FIG. 2 prior to coating with the adsorptive composite coating.
FIG. 4C provides a photograph of a support element around which a sheet adsorption element is rolled.
FIG. 4D provides a photograph of the sheet embodiment of the adsorption element shown in FIG. 2 set out with the support element prior to rolling.
FIG. 4E provides a photograph of the sheet embodiment of the adsorption element shown in FIG. 2 rolled into a compact rolled cylinder.
FIG. 4F provides a photograph of the rolled adsorption element shown in FIG. 3 housed in the inlet of a cylindrical housing of an adsorption apparatus according to one embodiment of the present invention.
Figure 4:
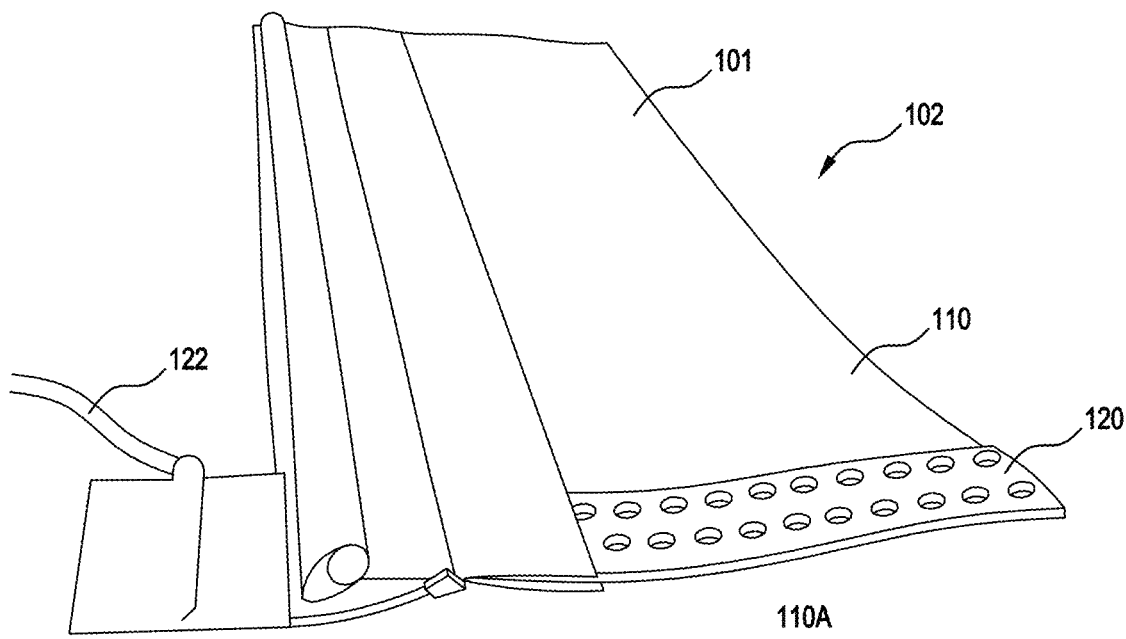
Figure 4:
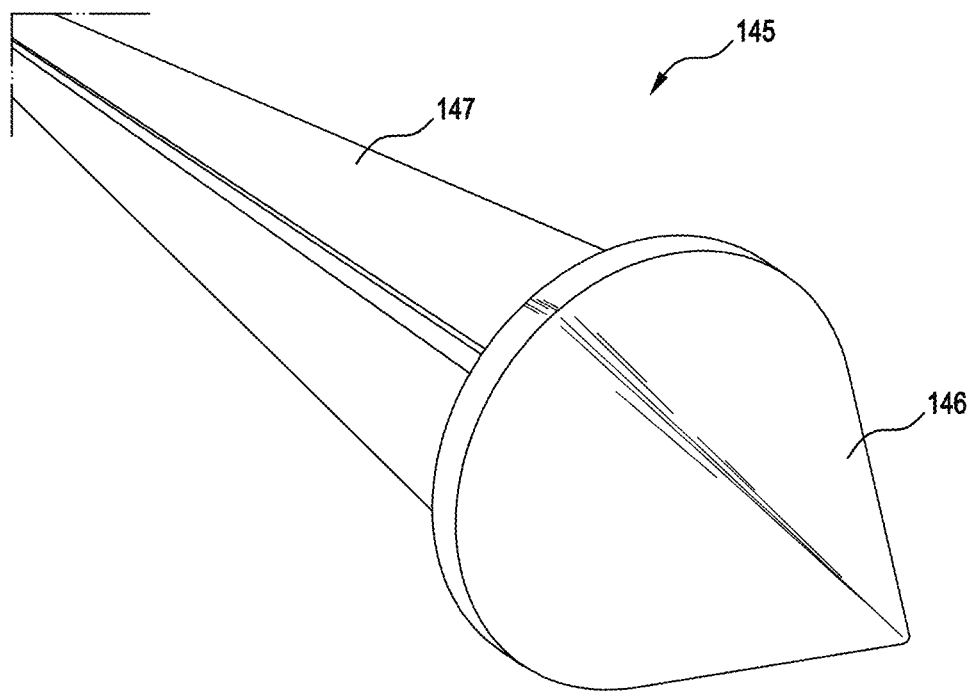

The planar sheet 110 illustrated in FIGS. 4A to 4F comprises a graphitic material coated fibreglass mesh. As shown in FIG. 4B, the planar sheet comprises a fibre glass mesh comprises a woven fibreglass cloth as the substrate. A woven fibre glass cloth has a resistive heating coating 101 comprising a mixture of carbon and graphite (in proportion according to the electrical properties desired) with PTFE as a binder sintered thereon under high temperature and pressure. The base cloth having predictable unit square resistance is then cut to width according to physical requirement. The cut cloth then has electrodes 120 fitted down each side comprising tinned-copper strips for electrical connection making it a finished 'element' with specific resistance and watt-density. An adsorptive composite coating 112 is then applied over that resistive heating coating 101 as explained below. The combination of a resistive heating layer with a MOF containing composite coating 112 allows the generation of heat on application of a current through the resistive heating layer. The MOF in the composite coating 112 can therefore be regenerated using direct and controlled heating, and which in return releases the adsorbed fluid from the pores of the MOF part of the composite coating 112.

As shown in FIG. 2(B), FIG. 4B and FIG. 4D, the planar sheet 110 includes a pair of spaced apart electrodes 120 for applying current flow through the substrate. The electrodes 120 comprise conductive strips positioned along the longitudinal edge of each planar sheet 110. The resistive heating material extends between each electrode 120. As noted above, these comprise tin covered copper strips (copper coated with solder, which it should be appreciated to be an alloy containing tin by itself or in combination with copper, silver, bismuth, indium, zinc, antimony, lead and traces of other metals) in the illustrated embodiment. However, any suitable conducting material could be used. Conductive connection wire 122 extends from each electrode 120 for connection to a suitable power source (not illustrated).

Figure 3:
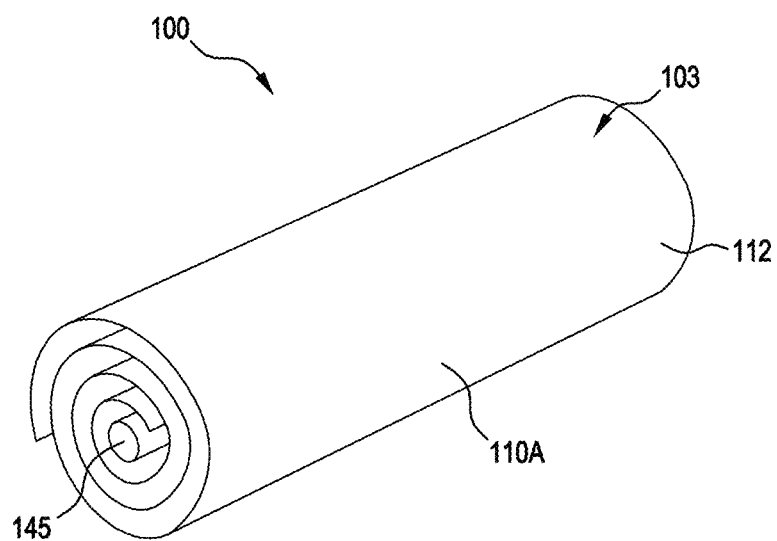
FIG. 3 illustrates the sheet embodiment of the adsorption element shown in FIG. 1A rolled into a compact rolled cylinder.

As shown in FIG. 3 and FIG. 4E, the adsorption element 100 is configured as a spiral rolled sheet, formed into a spiral rolled cylinder 100A. In embodiments, that rolled configuration can be formed by rolling the planar sheet 110 over a hollow support element 145 (best illustrated in FIGS. 4C, 4D and 4E). That spiral rolled sheet 110A is housed in cylindrical housing 200 as shown in FIGS. 4A and 4F (described in more detail below). The adjacent sections of the planar sheet 110 need to be electrically isolated from adjacent sections of the planar sheet in the spiral roll configuration. The planar sheet 110 therefore includes a Teflon insulating lattice 130 (FIG. 3(C)) which extends over and is seated on the upper surface 102 of the planar sheet 110. The Teflon insulating lattice 130 is configured to extending between adjacent sections of the planar sheet 110 when rolled up. It should be appreciated that the insulating lattice 130 could be formed from any suitable flexible insulating material, for example another polymer or plastic. The electrodes 120 equally should be electrically isolated in the rolled up configuration. Whilst not illustrated, it should be appreciated that the electrodes 120 are therefore preferably covered using an insulating tape, for example a Kevlar tape.

As shown in FIGS. 4C to 4F, the planar sheet 110 and Teflon insulating lattice 130 are typically rolled around a cylindrical support element 145, a bar which enables the sheet 110 to be rolled into a tight roll (spiral rolled cylinder 100A) to maximise the amount of sheet area that can be inserted into the housing/canister 210 of adsorption apparatus 200. The support element 145 includes a conical/cone shaped head 146 shaped to distribute the inlet gas flow away from the support element 145 to and through the spiral rolled cylinder 100A (adsorption element 100). As shown in FIG. 4F the cone shaped head 146 is position in the inlet 114A of the adsorption apparatus 200. The support element 145 also includes longitudinal slot 147 into which one end of the planar sheet 110 is inserted, with electrical connections and wires 122, which then runs through the center of the hollow support element 145, for example as shown in FIG. 4E.

As best shown in FIG. 4D, four 2 m planar sheets 100 are attached to the cylindrical support element 145, through slot 147 and overlaid to form a four-layer sandwich, separated by a Teflon insulating lattice 130. These four layers of planar sheet 110 are rolled together to form the spiral rolled cylinder 100A shown in FIG. 4E. This forms one of two banks of roller adsorption elements 100A that is inserted into cavity 211 of the adsorption apparatus/canister 200.

Figure 5:
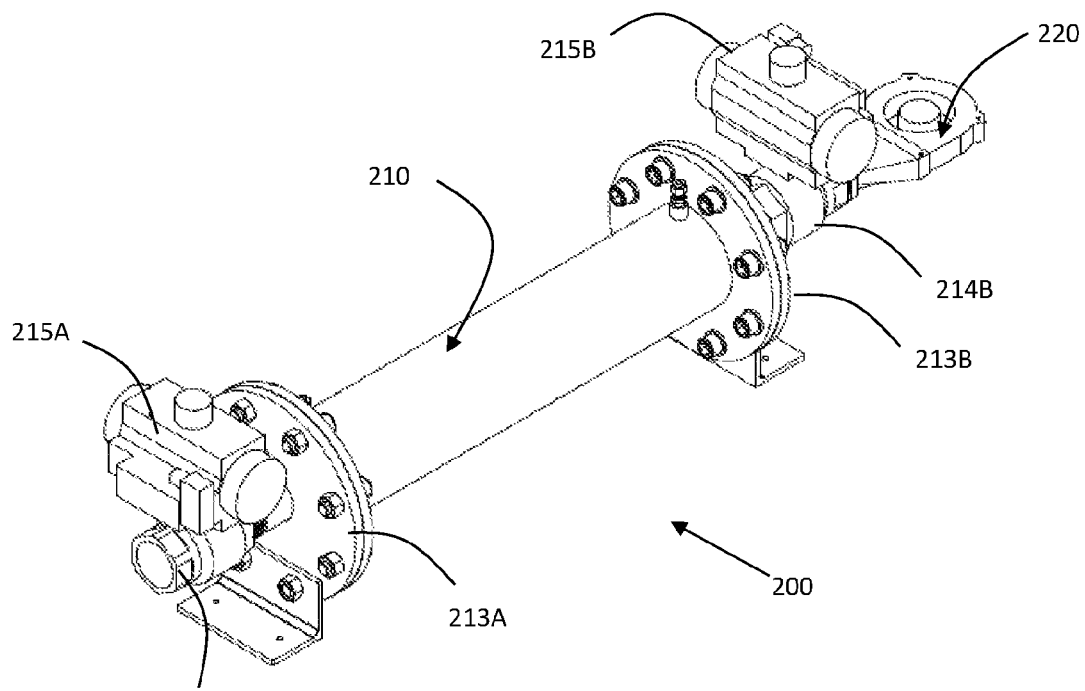
FIG. 5 illustrates one embodiment an adsorption apparatus according to the present invention.

Whilst not wishing to limit the invention, it should be appreciated that the Inventors considered a number of adsorption element configurations when designing the adsorption apparatus 200 and adsorption system 300 shown in FIGS. 4A, 4F and 5. Firstly, a ceramic monolith coated with the composite coating was investigated. However, ceramic monoliths were found to be too thermally insulating and required too much energy to achieve the required liberation of the captured $CO_2$. Conductive mesh arrangements were also investigated. However, it was found that a flexible resistive heating mesh spiral rolled into a coil to tightly pack within the adsorption canister provides a low enough thermal mass that it can be rapidly heated and cooled to shorten the requisite cycle time as much as possible and provided the necessary low pressure drop for a high volumetric feed gas flow rate.

FIGS. 4A, 4F and 5 illustrate an adsorption apparatus 200 according to one embodiment of the present invention. The adsorption apparatus 200 comprises a canister which includes a cylindrical housing 210 which encloses a cavity 211 into which the previously described adsorption element 100 is inserted in a tightly spiral rolled configuration as shown in FIG. 3. The cylindrical housing 210 is made fluid tight using end plates 213A and 213B which are bolted on and seal over the ends of cylindrical housing 210. End plate 213A includes inlet 214A configured to allow a gaseous feed stream to flow into cavity 211 and flow across the adsorption element 100 through to outlet 214B included in end plate 213B. Outlet 214B is fluidly linked to fan 220 which operates to draw the gaseous feed stream from the inlet 214A to the outlet 214B of the adsorption apparatus 200. Flow through inlet 214A and outlet 214B are controlled by ball valves 215A and 215B respectively. In the illustrated embodiments, the volume ratio of empty volume:adsorbent element within the housing 210 is around 1.3:1. The rolled adsorptive element 110A therefore occupies about 42% of the volume of the housing 210.

Whilst not illustrated, it should be understood that the adsorption system of the present invention can be constructed to include multiple adsorption apparatus 200 (canisters) each including housings 210 enclosing adsorption elements, for example a 3×3 array of individual adsorption apparatus 200. Each adsorption apparatus 200 in the adsorption system is connected in parallel to the gaseous feed stream. In this way, the adsorption capacity of the adsorption system is scalable. It should be appreciated that each adsorption apparatus 200 can be operated independently, in a different part of the adsorption and desorption (release) cycle described below. In this way a continuous adsorbate product can be generated from the adsorption system. The inventors have found that at least three parallel adsorption apparatus 200 need to be operated across spaced apart and different points the adsorption and regeneration cycles to provide continuous production of a particular gas.

Whilst not illustrated, it should be appreciated that the product flow gas from the outlet 214B can flow to a variety of secondary processes. For example, for carbon dioxide capture, the adsorption apparatus 200 can be integrated with a liquefier and/or dry ice pelletiser to provide dry ice on-demand.

Adsorption Apparatus Operation

The adsorption apparatus 200 is operated to capture a gaseous adsorbate, for example carbon dioxide, from a gaseous feed stream, for example atmospheric gas. For example, where the feed gas is atmospheric air, the adsorbate can be at least one of hydrogen, oxygen, argon, carbon dioxide, neon, helium or methane. In exemplary embodiments, the adsorption apparatus 200 is operated to capture carbon dioxide. However, a number of other adsorbates can be harvested (captured and released) as previously discussed.

The adsorption apparatus 200 is operated on a repetitive adsorption and desorption cycle, running through multiple cycles of:
(A) flowing a gaseous feed stream through the inlet 214A and across the adsorption element 100 of the apparatus 200 such that the adsorptive composite coating adsorbs a selected gaseous adsorbate from the gaseous feed stream; followed by
(B) heating the adsorptive composite coating by applying a current through the spaced apart electrodes 120, thereby generating heat within resistive heating material of the planar sheet 110 so as to release at least a portion of the gaseous adsorbate therefrom into a product fluid flow.

The steps of adsorbing the adsorbate in the adsorptive composite coating of the adsorption element and releasing that adsorbate through application of heat in a repetitive cycle so to produce the adsorbate. The cycle time can vary depending on factors as discussed above. However, it is expected that the cycle time would be between 10 minutes to 2 hours, more typically 10 to 30 minutes. As noted above, where multiple parallel connected adsorption apparatus 200 are used, the adsorption apparatus 200 can be operated simultaneously through different parts of this cycle, and therefore continuously produce the adsorbate in a product flow.

The heating step is preferably conducted at a temperature of between 60 to 150° C., preferably between 60 and 90° C., more preferably about 70° C.

In general, the adsorption apparatus 200 is designed to run at a high gaseous feed stream flow rate. The higher the flow, the more adsorbate passes over the adsorptive element 100, the higher the amount of adsorbate adsorbed. Accordingly, the gaseous feed stream preferably flows through the at least one adsorption element at a flow rate of at least 20 m³/hour, preferably at least 50 m³/hour, more preferably at least 60 m³/hour.

Where moisture is an issue (again for example atmospheric air), adsorption can be run in non-equilibrium conditions, and preferably well away from equilibrium conditions (as detailed above).

EXAMPLES

Example 1—Method of Coating an Adsorptive Composite Coating on a Flexible Substrate 1.1. General Adsorptive Composite Coating Preparation—(13 wt % TiFSiX, 1 wt % HPC, 1.5 wt % Cellulose Siloxane)

A slurry comprising 13 wt % TIFSIX-3-Ni (referred to hereinafter as TiFSiX), 1 wt % hydroxypropylcellulose (HPC) (binder 1), 1.5 wt % cellulose siloxane (binder 2) in an ethanol solvent was formed for coating a flexible substrate using the following steps:
1. To prepare HPC (MW 1000 kDa) solution, 5 g of HPC is slowly added (bit by bit to avoid clumps) into a stirring 500 mL ethanol. [5 g HPC/500 g ethanol=1 wt %]
2. The solution is put on a stirrer for at least 24 hr on high stirring rate (>600 rpm).
3. After the HPC solution is homogenously mixed, 65 g of TiFSiX is added to it to achieve 13 wt % MOF in the slurry, the slurry is stirred for at least 2 days with occasional manual shaking to help breaking up clumps. [65 g TiFSiX/500 g ethanol=13 wt %]
4. 40 g of binder (see below for steps of making this) can be added along with TiFSiX in step 3) or can be added a few hours after TiFSiX has been added. [40 g×0.025 g/g/65 g TiFSiX=1.5 wt % binder to TiFSiX]
5. The resulting slurry is ready for coating.

1.2. Binder (Cellulose Siloxane Mixture) Preparation

A cellulose siloxane mixture binder solution (0.025 g binder/g solution) was prepared using the following steps:
1. 6 g polymethylhydroxysiloxane (PMHS) is added into a mixture of 240 g ethanol and 240 g deionised water.
2. 6 g methyl cellulose (MC) (MW 86 kDa) is then added to (1) very slowly, making sure that the cellulose is fully dissolved each time before the next addition. The mixture is put on a roller, or stirrer on high speed. [(6 g+6 g) binder/480 g ethanol water=0.025 g/g]
3. After the binder has achieved homogenous consistency, it is then put on a roller to ensure good dispersion over time.

1.3. Other MOF Compositions Used for Coating at Various Binder Additions

Table 1 provides the composition of three alternate adsorptive composite coating compositions formed in ethanol and deionised water solvent.

TABLE 1

Alternative adsorptive composite coating compositions

| Coating slurry various binder concentrations | TiFSiX mass added (g) | HPC mass added (g) | PMHS mass added (g) | MC mass added (g) |
|---|---|---|---|---|
| MOF @ 1 wt % binder | 65 | 5 | 0.33 | 0.33 |
| MOF @ 1.5 wt % binder | 65 | 5 | 0.50 | 0.50 |
| MOF @ 5 wt % binder | 65 | 5 | 1.65 | 1.65 |

1.4. Coating Process

Each of the coatings were blade cast/coated onto the flexible planar sheet 110 shown in FIG. 4B in an inert atmosphere to protect the MOF from any premature degradation. As described above, that sheet comprises a woven fibre glass cloth having a resistive heating coating 101 comprising a mixture of carbon and graphite (in proportion according to the electrical properties desired) with PTFE as a binder sintered thereon under high temperature and pressure. The sheet 110 has electrodes 120 fitted down each side comprising tinned-copper strips for electrical connection making it a finished 'element' with specific resistance and watt-density.

After blade casting, the coating is dried by heating the wet coated substrate to between 60 to 100° C. to substantially remove the solvent from the coating. The coated substrate is then coiled up and the electrical connections made (as shown in FIGS. 4D and 4E and described in more detail above). This is typically done very quickly to minimise air exposure.

A further activation step is undertaken after application of the composite coating 112 to the planar sheet 110 to remove the solvents of synthesis to leave the exposed pores within the MOFs. This is achieved by heating the composite coating 112 in a 1500 SCCM flow of helium gas at 100° C. for 24 hours.

The resulting planar adsorption element 100 has the dimensions of 2 m length×0.32 m width and a loading of approximately 30 to 80 g/m² MOF (in some embodiments around 37 g/m²), where the where the surface area m² is including both coated sides of the adsorption element 100.

Example 2—Method of Coating an Adsorptive Composite Coating on a Flexible Substrate (Higher Cellulose Siloxane Binder Content)

2.1. General Adsorptive Composite Coating Preparation—(13 wt % TiFSiX, 1 wt % HPC, 5 wt % Cellulose Siloxane)

A slurry comprising 13 wt % TIFSIX-3-Ni (referred to generally hereinafter as TiFSiX), 1 wt % hydroxypropylcellulose (HPC) (binder 1), 5 wt % cellulose siloxane (binder 2) in an ethanol solvent was formed for coating a flexible substrate using the following steps:
1. To prepare HPC (MW 1000 kDa) solution, 5 g of HPC is slowly added (bit by bit to avoid clumps) into a stirring 500 mL ethanol. [5 g HPC/500 g ethanol=1 wt %]
2. The solution is put on a stirrer for at least 24 hr on high stirring rate (>600 rpm).
3. After the HPC solution is homogenously mixed, 65 g of TiFSiX is added to it to achieve 13 wt % MOF in the slurry, the slurry is stirred for at least 2 days with occasional manual shaking to help breaking up clumps. [65 g TiFSiX/500 g ethanol=13 wt %]
4. 80 g of binder (see below for steps of making this) can be added along with TiFSiX in step 3) or can be added a few hours after TiFSiX has been added. [80 g×0.041 g/g/65 g TiFSiX=5 wt % binder to TiFSiX]
5. The resulting slurry is ready for coating.

2.2. Binder (Cellulose Siloxane Mixture) Preparation

A cellulose siloxane mixture binder solution (0.025 g binder/g solution) was prepared using the following steps:
1. 9.72 g polymethylhydroxysiloxane (PMHS) is added into a mixture of 240 g ethanol and 240 g deionised water.
2. 9.72 g methyl cellulose (MC) (MW 86 kDa) is then added to (1) very slowly, making sure that the cellulose is fully dissolved each time before the next addition. The mixture is put on a roller, or stirrer on high speed. [(9.72 g+9.72 g) binder/480 g ethanol water=0.041 g/g]
3. After the binder has achieved homogenous consistency, it is then put on a roller to ensure good dispersion over time.

The coating process follows the steps taught in Example 1, section 1.4.

Example 3—Adsorption Cycles Using Single Canister Adsorption Device 3.1 Adsorption The $CO_2$ uptake capacity of the planar adsorption element 100 formed in Example 1 was studied using a single adsorption canister set up. The planar adsorption element 100 was formed with a loading of approximately 400 g of MOF. An example of a single adsorption apparatus/canister 200 is shown in FIG. 5. The illustrated adsorption canister 200 is 650 mm in length and has an internal diameter of 123.8 mm. Four adsorption elements 100 were loaded in the canister 200 in a scroll/rolled up orientation as detailed above allowing free flow of the feed gas through the canister 200.

In a first configuration, the canister 200 has 2 banks with four 2 m adsorption elements 100 (meshes) scrolled together to make a bank. Each bank comprises four 2 m meshes attached to the cylindrical support element 145 and overlaid together. These four layers of meshes are rolled together to form the rolled adsorption element 100A shown in FIG. 4E. The overall canister provides a MOF loading of 400 g, with a substrate surface area of 1234 $m^2/m^3$ with a MOF packing density of about 6% volume of MOF over the total volume of canister.

In a second configuration, each bank comprises two 2 m meshes attached to the cylindrical support element 145 and overlaid together. These two layers of meshes are rolled together to form the rolled adsorption element. The overall canister provides a MOF loading of 200 g, with a substrate surface area of 1234 $m^2/m^3$ with a MOF packing density of about 3% volume of MOF over the total volume of canister.

Dry (containing 200 ppm $H_2O$ and 450-500 ppm $CO_2$) and wet (containing 1.5-1.8% $H_2O$ and 450-500 ppm $CO_2$) feed was used to evaluate the performance of our MOF for direct air capture. Prior to the first adsorption run, freshly coated mesh was activated by heating the MOF under 1500 SCCM of He at 100° C. for 24 hours. Post activation, air (wet or dry) is flowed through the mesh at flowrates 20-1000 L/m for 1-3 hours. The target flowrate was 1000 L/m (60 $m^3/hr$). The pressure in the canister is monitored using pressure transducers and depending on the feed flowrate, a backpressure of 1.3-1.7 bar is generated in the canister.

Figure 6:
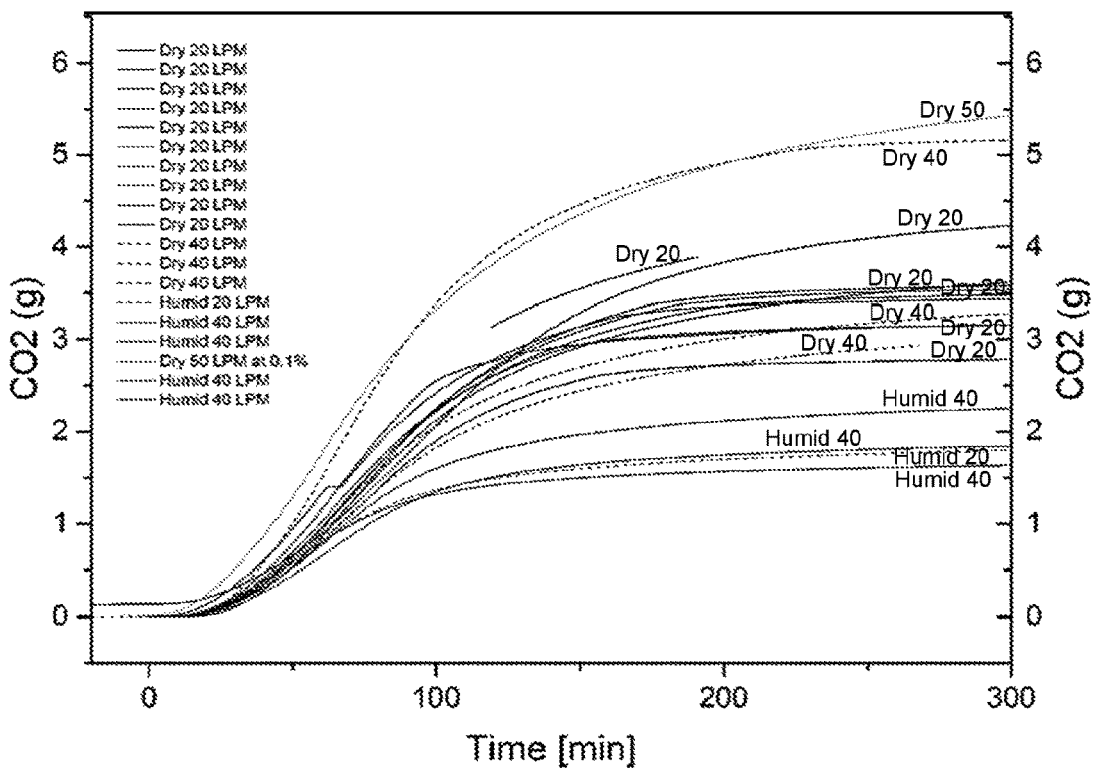
FIG. 6 provide breakthrough curves of $CO_2$ adsorption versus time on a TIFSIX-Ni coated adsorption element operated in a canister adsorption apparatus shown in FIG. 5.

Breakthrough curves for $CO_2$ and $H_2O$ are collected analysing the gas exiting the canister with the aid of a mass spectrometer. FIG. 6 provides examples of $CO_2$ breakthrough curves for the adsorptive element formed according to Example 1 (13 wt % TiFSiX, 1 wt % HPC, 5 wt % cellulose siloxane) for dry air flow conditions (as above) at 20, 40 and 50 L/min gas flow and wet air flow conditions (as above) at 20, 40 and 50 L/min gas flow.

3.2 Regeneration

At the end of the adsorption process, a pre-purge tank is used to evacuate the canister to 0.08 bar within 20 seconds. The adsorption elements 100 are then heated up by supplying voltage (60-120 V) a variable power supply. The rate of heating depends on the voltage supplied, the higher the voltage the faster the heating rate. The temperature in the canister 200 is monitored through two thermocouples (not illustrated) inserted in each adsorption element 100 in the canister 200. One of the thermocouples is connected through a PID controller and the power supply to control the maximum temperature in the canister which is set to 80° C.

Due to pressure limitations on the mass spectrometer used, regeneration is carried out under a gentle He flow (500 SCCM). The characteristics of the He carrier gas is analysed real time with the mass spectrometer. He is then subtracted from the $CO_2$ and $H_2O$ peaks to evaluate the volume/mass generated. At the end of the regeneration, the adsorption process is repeated and the cyclability of the MOF is evaluated.

Figure 7:
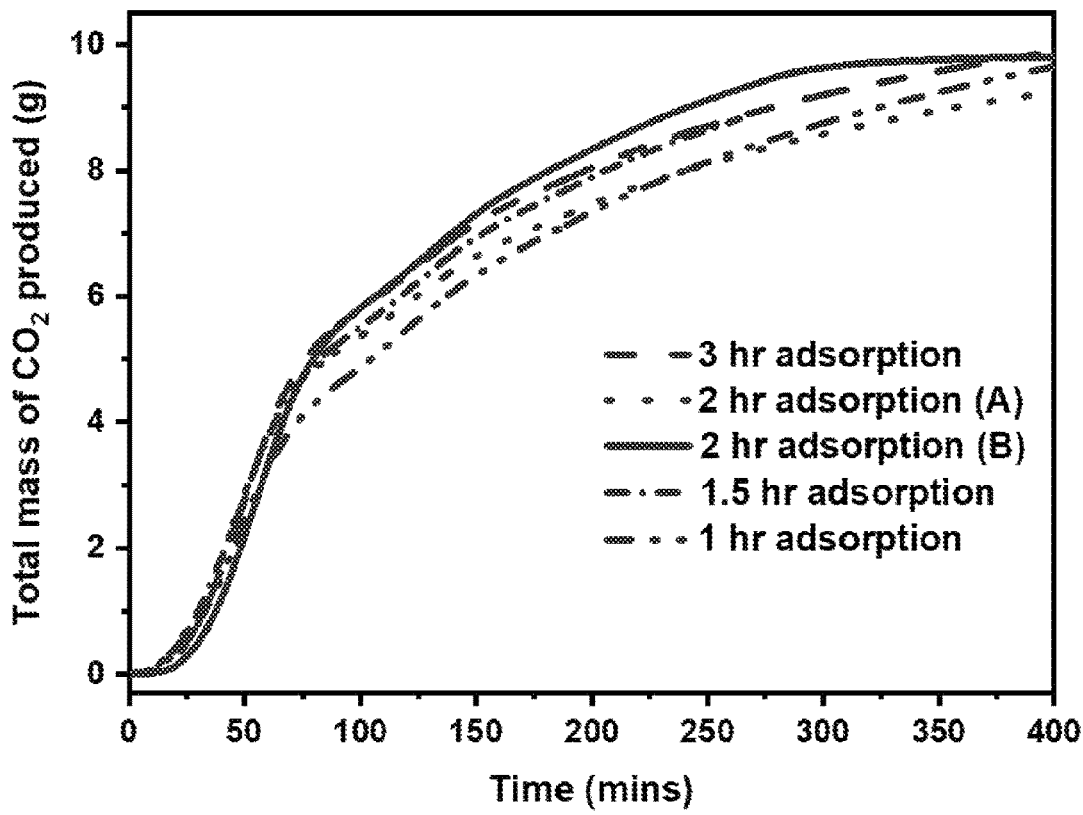
FIG. 7 illustrates the amount of $CO_2$ produced from one canister (as illustrated in FIG. 5) with feed flow rate is 90 LPM, containing dry air ($CO_2$~450 ppm and $H_2O$<300 ppm for different adsorption times of 1, 1.5, 2 (+repeat) and 3 hours.

FIG. 7 illustrates the amount of $CO_2$ produced from one canister as described above having an MOF adsorptive composite coating loading of 400 grams. Feed flow rate is 90 LPM, containing dry air ($CO_2$ ~450 ppm and $H_2O$<300 ppm). The feed flow was fed through the canister for different adsorption times of 1, 1.5, 2 (+repeat) and 3 hours. A vacuum purge was conducted after adsorption to 100 mbar then back-filled with helium to 1 bar. Desorption achieved at 80-100° C. using 120 V and slow flow of helium (900 sccm). Appreciable amounts of $CO_2$ (~5 g) are shown to be produced in less than 75 mins.

Figure 8:
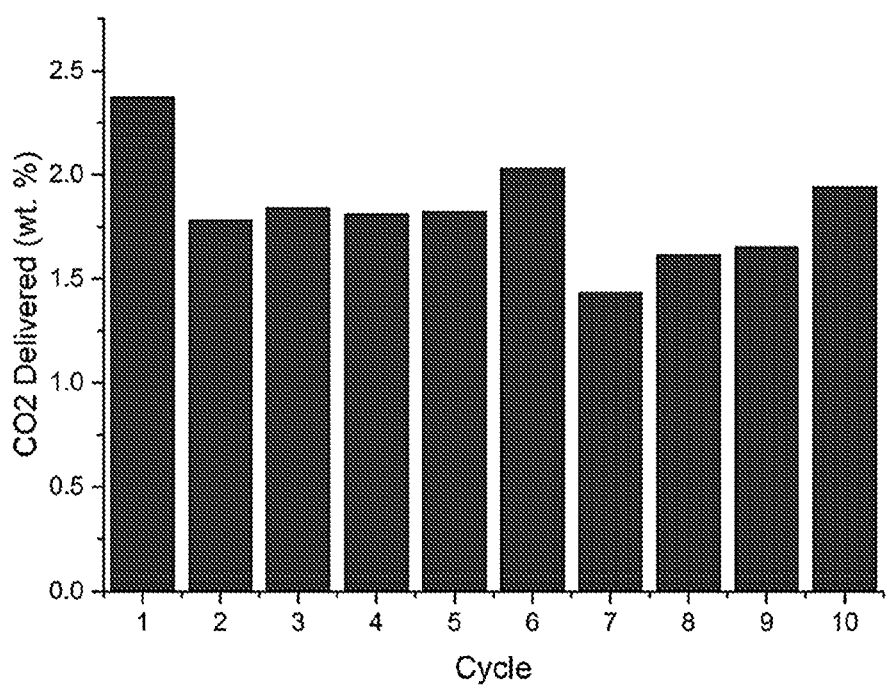
FIG. 8 provides a comparison of $CO_2$ delivered for ten consecutive adsorption and desorption cycles of a canister adsorption apparatus shown in FIG. 5.

FIG. 8 provides an indication of the amount of $CO_2$ delivered over 10 cycles, for dry air adsorption at 40 L/min for 1 hour, and desorption for 1 hour. The results illustrate that the canister provides a reasonably repeatable $CO_2$ delivery over multiple adsorption and desorption cycles.

The hydrophobicity of the adsorptive composite coating was investigated by varying the cellulose siloxane content from 1.5% to 5% as indicated by the different composite coating compositions detailed in Example 1 and Example 2. The $CO_2$ uptake for each of adsorptive composite coatings were measured, with the results shown in FIG. 9.

Figure 9:
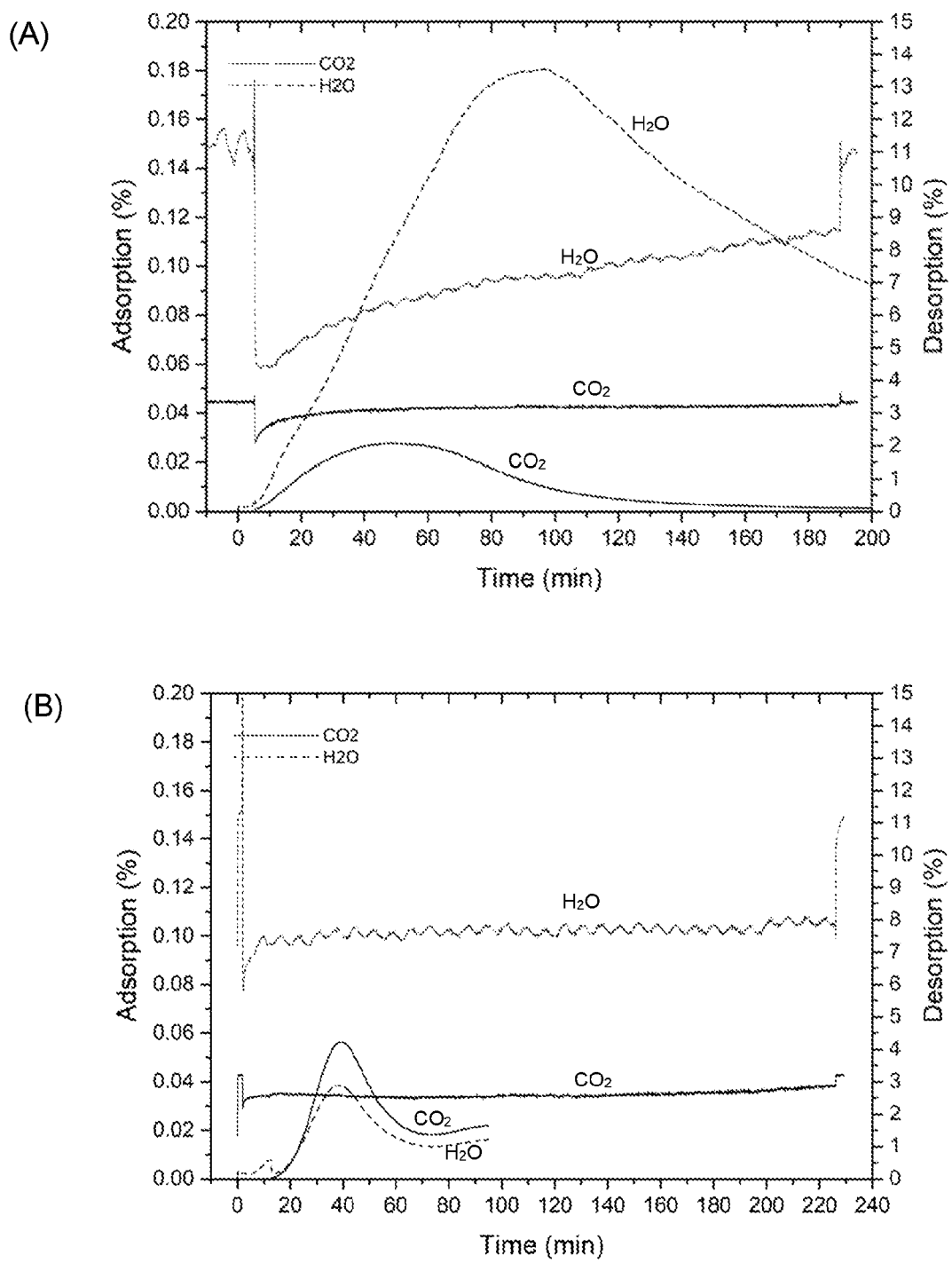
FIG. 9 illustrates the adsorption and desorption profiles of a rolled adsorptive element in a canister illustrated in FIG. 5 having (a) 1.5 wt. % cellulose siloxane in the adsorptive composite coating; and (b) 5 wt. % of cellulose siloxane in the adsorptive composite coating.

FIG. 9 shows the adsorption and desorption profiles with 1.5 wt. % (A) and 5 wt. % (B) of cellulose siloxane in the MOF composite. In these runs the feed gas flow rate is 40 LPM, containing air ($CO_2$ ~450 ppm and $H_2O$ 1500 ppm) and was run for 3 hours. Desorption was conducted using vacuum purge after adsorption to 100 mbar then back-filled with helium to 1 bar. Desorption achieved at 80 to 100° C. using 60 V (left) and 80 V (right) and slow flow of helium 500 sccm (left) and 900 sccm (right). Importantly, increasing the cellulose siloxane content (hydrophobic binder) increases the hydrophobicity, significantly reducing the $H_2O$ update, without a loss in $CO_2$ uptake.

Figure 10:
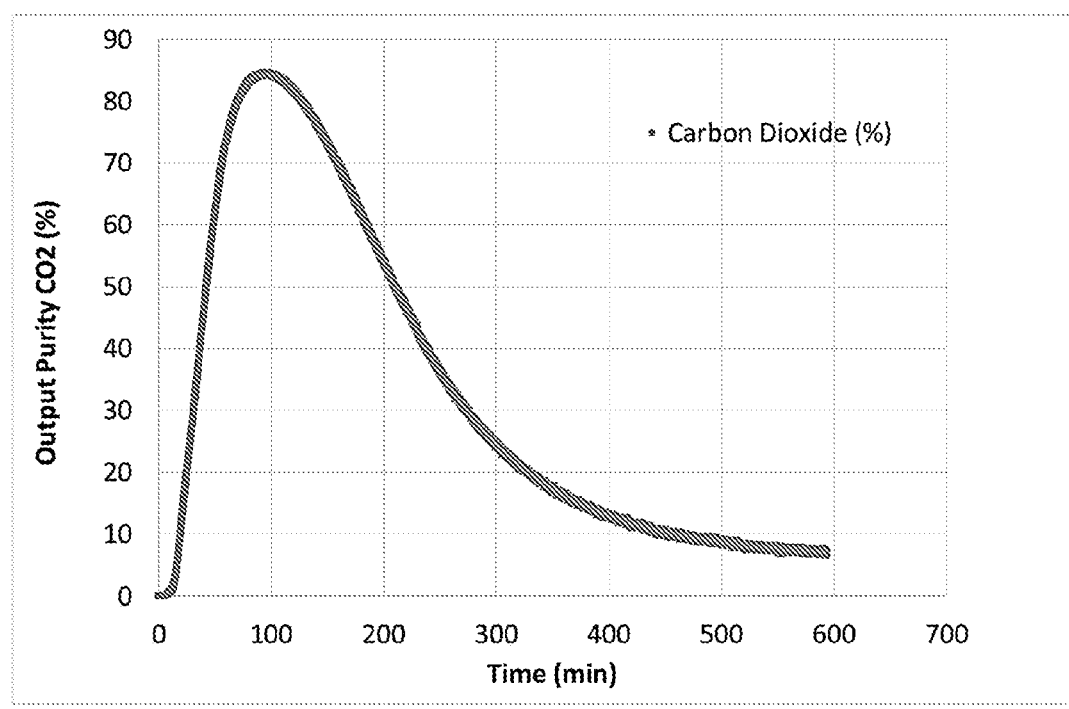
FIG. 10 provides a plot of purity of $CO_2$ in output with an adsorptive element having a MOF adsorptive composite coating loading of 200 grams in the canister (second configuration—two banks of 2 layered adsorption elements).

The purity of the $CO_2$ produced was also measured. FIG. 10 illustrates the purity of $CO_2$ in output. MOF composite loading of 200 grams. Feed flow rate was 20 LPM, containing air ($CO_2$ ~500 ppm and $H_2O$ ~350 ppm) and adsorption was undertaken for 3 hours. Desorption was achieved using vacuum purge after adsorption to 100 mbar then back-filled with helium to 1 bar. Desorption achieved at 80-100° C. using 48 V and slow flow of helium (500 sccm). Back filling with helium or another inert gas is important to prevent mixing of $CO_2$ into air. Purity of the $CO_2$ produced peaks at around 90 mins.

Figure 11:
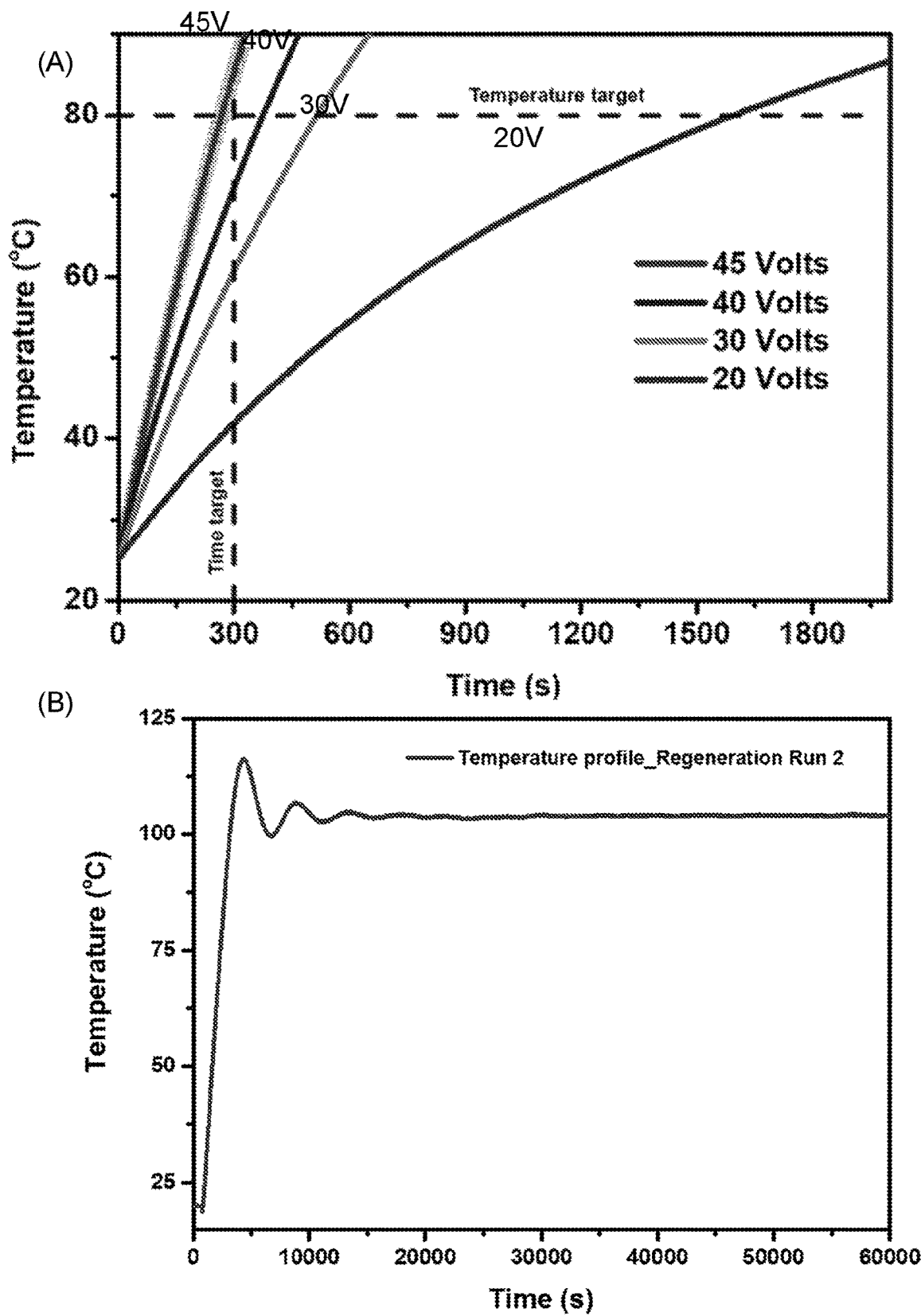
FIG. 11 provides a heating profile of the resistive heating function of the adsorption element showing (a) Temperature profiles under different voltages for the four planar adsorption elements per canister configuration (second configuration—two banks of 2 layered adsorption elements); and (b) Temperature profile under 120 V for the 8 planar adsorption elements per canister configuration (first configuration—two banks of 4 layered adsorption elements) with temperature controller set to 100° C.

The heating profile of the resistive heating element system of the adsorption element 100 shown in FIGS. 3A to 3F was investigated to determine the optimum voltage required to heat the substrate to 80° C. in 300 s or less. FIG. 11 illustrates the heating profile of the substrate. (A) Temperature profiles under different voltages for the 4 planar adsorption elements per canister configuration (second configuration—two banks of 2 layered adsorption elements). (B) Temperature profile under 120 V for the 8 planar adsorption elements per canister configuration (first configuration—two banks of 4 layered adsorption elements) with temperature controller set to 100° C. The results indicate that at least 45V was required to meet the time target using the first canister configuration.

Figure 12:
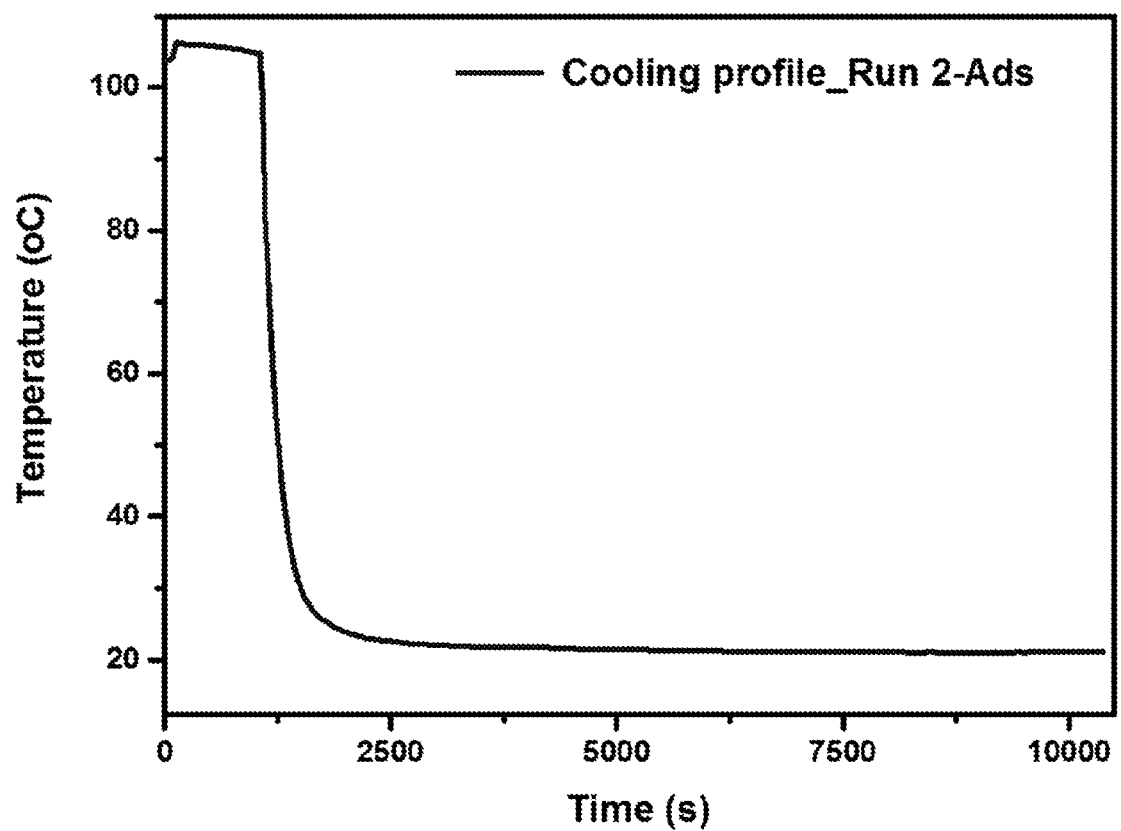
FIG. 12 illustrates the cooling profile of the 8 planar adsorption elements configuration (first configuration—two banks of 4 layered adsorption elements) under a feed flow rate 90 LPM.

The cooling profile of the 8 planar adsorption elements configuration (first configuration—two banks of 4 layered adsorption elements) under a feed flow rate 90 LPM was also measured. These results are shown in FIG. 12.

Example 4

4.1 Adsorption-Desorption Cycle of Single Adsorption Modules

The suitability of the adsorption element 54 for adsorbing $CO_2$ was determined using breakthrough experiments performed on a single adorption module (as shown in FIG. 1) under the conditions listed in Table 2. The adsorption chamber 54 of this single adsorption module contained a loading of 60 kg/m³ for the MOF-polymer nanocomposite (as provided on the adsorption element 53 described above) and of the same composition as detailed in the preceding examples, in particular Example 3 (13 wt % TiFSiX (relative to solvent mass), 1 wt % hydroxy propyl cellulose (HPC) (relative to solvent mass), 1.5 wt % cellulose siloxane (CS) (relative to TiFSiX mass). The adsorption chamber 54 was fitted with pressure transducers and thermocouples on the inlet side and outlet side. The concentration of each component including $CO_2$, $H_2O$, $O_2$ and $N_2$ was monitored using a Pfeifer Omnistar GSD 320 O series mass spectrometer.

Figure 13:
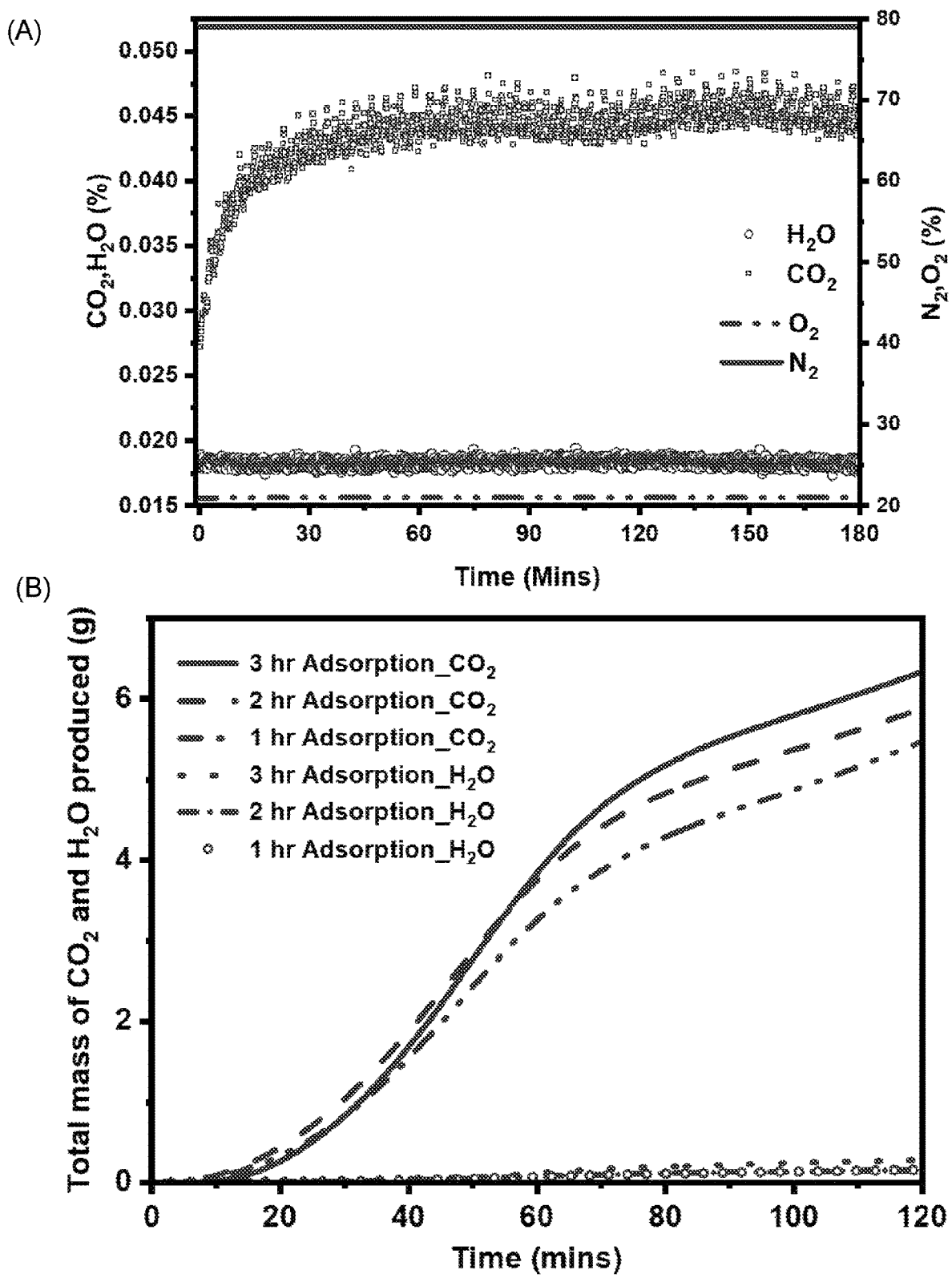
FIG. 13 illustrates (a) Preliminary breakthrough curves for a single module; and (b) Mass of $CO_2$ and $H_2O$ produced for different adsorption times at a regeneration temperature of 80° C.
Figure 15:
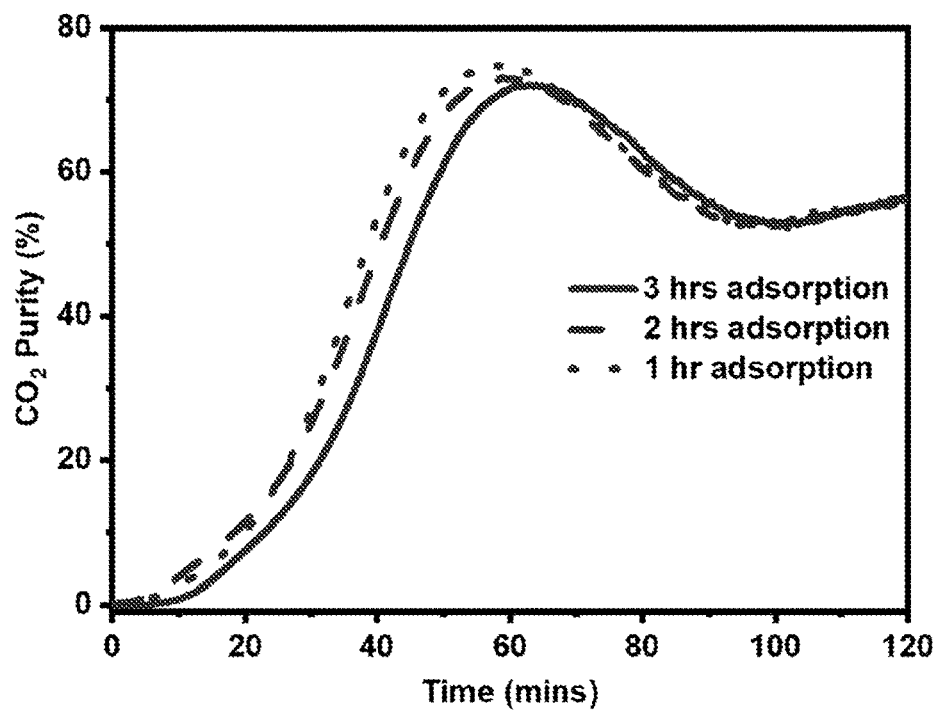
FIG. 15 illustrates $CO_2$ breakthrough curves for different adsorption times. Feed air initially bypasses the adsorption chamber to establish a background signal before switching the feed to the chamber.

FIG. 13(a) shows a typical breakthrough curve during the adsorption phase for the major components of the feed air at a flow rate of 5.4 m³h⁻¹. The slow flow rate was chosen to carefully measure capacity and kinetics of the adsorption phase. According to the resulting output stream there was no obvious uptake of either $N_2$ or $O_2$ by the nanocomposite. Due to the design and configuration of the adsorption module, the $CO_2$ breakthrough time is almost instantaneous while the equilibration or saturation time is between 60-90 minutes. FIG. 15 provides the results for multiple experiments with varying adsorption times.

The desorption phase was tested at 80° C. using a helium carrier gas at a flow rate of 500 cm³ min⁻¹, see FIG. 13(b). The use of a carrier gas during desorption allowed the output to be measured more accurately than with a vacuum-driven desorption. The results reveal a slight difference in the amount of $CO_2$ produced from the module after different adsorption times. The 3 hour adsorption time recorded the highest yield of 6.34 g of $CO_2$, with the 2 hour and 1 hour adsorption time recording a yield of 5.88 and 5.48 g respectively. The configuration and composition of the module ensured minimal water uptake. The mass of $H_2O$ produced after 120 minutes of regeneration for 3, 2 and 1 hour(s) of adsorption was 0.29, 0.16 and 0.16 g respectively. Prolonging the adsorption time by 1 extra hour resulted in almost double the $H_2O$ uptake (180%) compared with a minor increase in $CO_2$ uptake (108%). Therefore, the kinetics of the system may be exploited by shortening the adsorption time.

Figure 16:
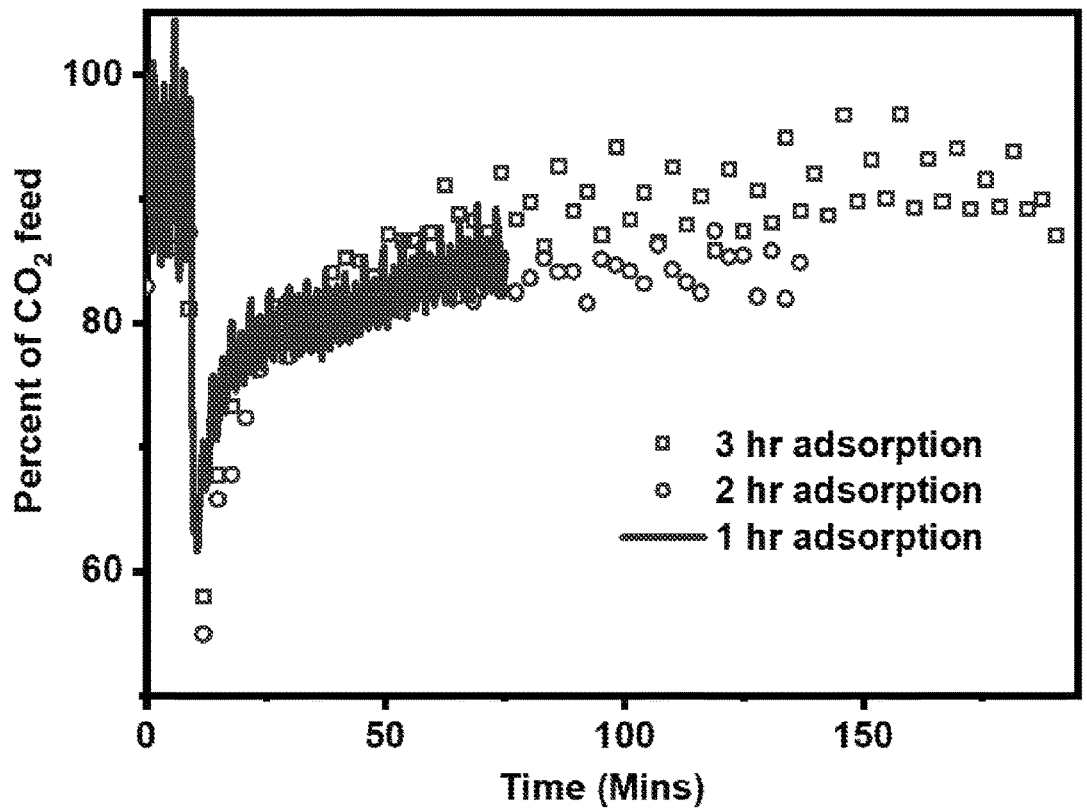
FIG. 16 illustrates the purity of $CO_2$ produced during regeneration of the experimental $CO_2$ adsorption module.

The purity of the $CO_2$ released as a function of regeneration time was also monitored, as indicated in FIG. 16. More than 70% purity was achieved after 1 hour of regeneration. Note that the purity is calculated by subtracting the amount of helium in the feed, i.e. the balance contains $N_2$, $O_2$ and $H_2O$.

From these results on a single module, the design of a continuous adsorption-regeneration system utilizing multiple modules was implemented and discussed in the next section.

TABLE 2

Process parameters for each module in the adsorber demonstrator

| Parameter (units) | Preliminary Testing (single module) | Pilot-Scale Demonstration (per module) |
|---|---|---|
| Feed flow rate (m³h⁻¹) | 5.4 | 50 |
| Adsorption time (min) | 180 | 60 |
| Regeneration time (min) | 120 | 30 |
| Feed H₂O (ppm) | 180 | 1000 |
| Feed CO₂ (ppm) | 450 | 400 |
| Regeneration Temperature (° C.) | 80 | 80 |
| Regeneration Carrier or Method | Helium | Vacuum |
| CO₂ Output (g) | 6 | 2 |
| Energy Consumption (Wh) | | |
| Heating | — | 1.6 |
| Fans | | 0.6 |
| Vacuum | | 0.1 |

4.2 Continuous Production using Multiple Modules

Results obtained from the single adsorption module were used as a basis to build an experimental adsorber demonstrator with three modules capable of continuous capture and production. The demonstrator was automated to combine the product of the three modules. Each module included an adsorption chamber 54 having the same configuration as the adsorption chamber 54 of the single module shown in FIG. 1.

A cascading process of adsorption-regeneration steps was automated according to Table 3. The automation involved a 1 hour adsorption/cooling time and 30 minutes regeneration time designed to be alternated from one module to the other. Process parameters are listed in Table 2. In all scenarios, the modules were equipped with $CO_2$ sensors to monitor the purity of $CO_2$ generated during the regeneration process. Temperature, pressure and power consumed by the process were parameters also monitored during the operation. For the adsorption run, air with $CO_2$ concentrations of 400-500 ppm and $H_2O$ concentration of 1000 ppm at 25° C. was fed into each adsorption chamber at a flow rate of 50 m³h⁻¹. Regeneration via resistive heating of the adsorption element (as detailed above) was carried out at 80° C. under a voltage of 120 V.

Figure 14:
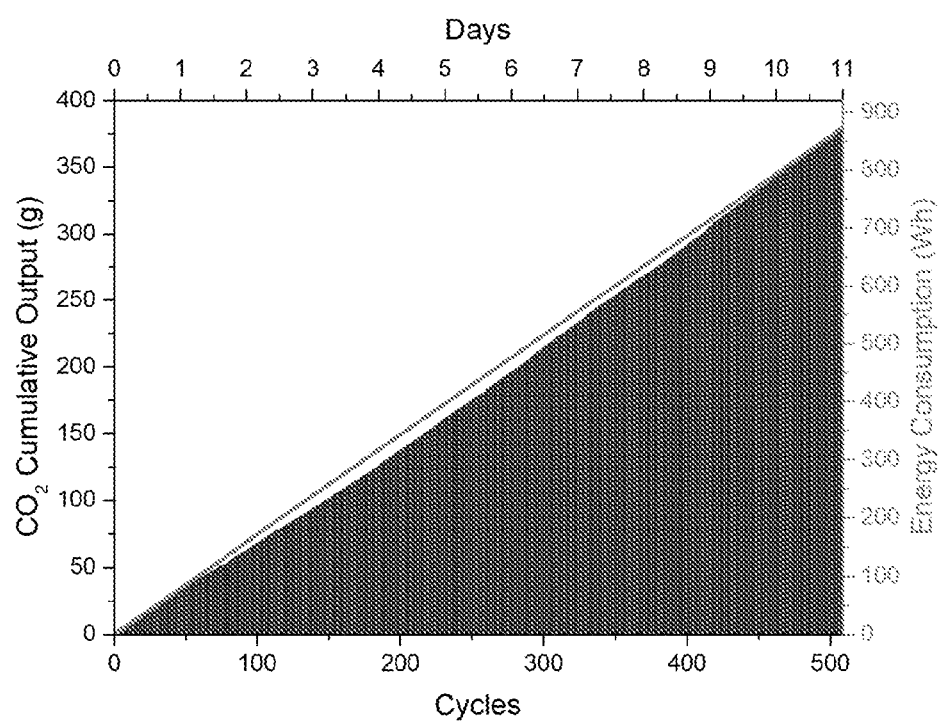
FIG. 14 illustrates the cumulative $CO_2$ generated by the test adsorption apparatus with three $CO_2$ adsorption modules over 500 cycles with energy consumption.

FIG. 14 presents the $CO_2$ output from the three module demonstrator consisting of 3 modules over 11 days of operation and 500 cycles. The demonstrator produced more than 350 g of $CO_2$ at an average energy consumption of 2.3 Wh/g-$CO_2$. The energy consumption per cycle for the module included the power consumption of the fans, the vacuum pump and the resistive heating. Power usage was uniform across all cycles as the operation times were identical for each module and is not affected by $CO_2$ output.

Analysis of the resistive heating process revealed that the energy required to achieve desorption of the $CO_2$ from the nanocomposite adsorbent in the module to be 1.6 kWh/kg-$CO_2$. In comparison to 5.25 GJ of gas and 366 kWh of electricity required per ton of $CO_2$ captured in an aqueous sorbent system. The performance of the nanocomposite adsorbent the inventive module also revealed a very good level of stability of the system with no evidence of capacity loss over the 500.

It should be appreciated that resistive heating can be powered with renewable energy sources like solar, hydrothermal or wind. Assuming that the cost of renewable energy is $0.05 USD/kWh, the demonstrator could produce $CO_2$ at an operational cost of $115 USD/ton-$CO_2$. Alternatively, the heating method could be replaced with free waste heat from industrial processes that would bring the cost down further to $35 USD/ton-$CO_2$. In the short term, energy prices of around $0.15 USD/kWh are readily available and lead to an operational cost of $345 USD/ton-$CO_2$.

TABLE 3

Continuous production process using a cascade adsorption-regeneration steps through the three modules. X indicates adsorption/cooling time and Y indicates regeneration time.

|  | CYCLE 1 | | | CYCLE 2 | ... | CYCLE N |
|---|---|---|---|---|---|---|
| Time (mins) | 30 | 60 | 90 | 180 | ... | N × 90 |
| Module 1 | X | X | Y | REPEAT | ... | REPEAT |
| Module 2 | X | Y | X | | | |
| Module 3 | Y | X | X | | | |

Example 5

A number of different MOF composite coatings was tested to determine the best coating composition for maximising carbon dioxide adsorption whilst minimising water adsorption. The coating compositions with binder contents are listed in Table 5 comprising mixtures of MOFs SiFSiX and TiFSiX with cellulose siloxane, polyvinyl fluoride (PVDF), poly(hexafluoropropylene) (PHFP) or a copolymer of 1,3-Bis(4-aminophenoxy) benzene (TPE-R) Bisphenol A diphthalic anhydride (BPADA) and Polydimethylsiloxane (PDMS), (TPE-R-BPADA-PDMS). The coatings were formulated following the methods outlined in Examples 1 and 2.

The adsorption capacity of these coatings was measured as follows: The water vapour uptake was measured by using Quantachrome Autosorb-1-C unit which employed Vapor Sorption Option. The vapor generator was housed within the unit manifold chamber, where it was heated to 50° C. and thermostatically controlled. A solenoid valve opened the pump ballast for all-important venting of condensable vapours. Water vapor adsorption was conducted from $P/PO=10^{-3}$ to 0.5 with distilled water as the vapor source. The bath temperature was held below room temperature with a minimum of 5° C. difference. Equilibration bandwidth was set at 0.02 or 98%. Water uptake was measured at 50% relative humidity. Carbon dioxide uptake was measured at 0.4 mbar and 298 K by a volumetric method using a Micromeritics 3Flex instrument. Samples were activated at 150° C. under dynamic vacuum at $10^{-6}$ Torr for 24 h prior to measurements. The results of these comparative experiments are set out in Table 4.

TABLE 4

Water adsorption and Carbon Dioxide adsorption in composite coatings of different compositions.

| MOF composite composition | Water vapour uptake (@ 50% RH, 17° C.) mL (STP) | $CO_2$ uptake (@ 400 ppm) mL (STP) |
|---|---|---|
| Pristine SiFSiX | 329 | 6 |
| add 2.5 wt % Cellulose Siloxane | 144 | 4.53 |
| add 5.0 wt % Cellulose Siloxane | 218 | 1.29 |
| add 5.0 wt % PVDF-PHFP | 233 | 4.44 |
| add 5.0 wt % TPE-R-BPADA-PDMS | 230 | 2.99 |
| Pristine TiFSiX | 131 | 6.72 |
| TiFSiX + 5 wt % PVDF | 63.8 | 2.24 |
| TiFSiX + 5 wt % PVDF + 1 wt % HPC | 69.2 | 3.316 |
| TiFSiX + 1 wt % Cellulose Siloxane R | 81 | 9.86 |
| TiFSiX + 1 wt % Cellulose Siloxane | 63.6 | 9.63 |
| TiFSiX + 2 wt % Cellulose Siloxane | | 7.84 |
| TiFSiX + 3 wt % Cellulose Siloxane | 56.3 | 7.17 |

The results indicate that the addition of Cellulose Siloxane provides good hydrophobicity properties. Moreover, use of Cellulose Siloxane in the binder with TiFSiX provides the unexpected result of providing increased $CO_2$ uptake while decreasing water uptake.

Example 6

A number of different MOF composite coatings was tested to determine the different TiFSiX coating compositions for carbon dioxide adsorption whilst minimising water adsorption. The coating compositions comprised TiFSiX mixed with different binder contents, and were mixtures of MOF TiFSiX with (wt % solid basis):

5 wt % cellulose siloxane (CS);
5 wt % CS and 1 wt % hydroxy propyl cellulose (HPC);
2.5 wt % and 1 wt % HPC;
5% polydimethylsiloxane (PDMS); and
2.5 wt % CS.

The coatings were formulated following the methods outlined in Examples 1 and 2. The adsorption capacity of these coatings was measured following the methodology set out in Example 5. Carbon dioxide uptake was estimated from breakthrough experiments with $CO_2$ having a partial pressure of 0.4 mbar and feed temperature of 298 K.

Figure 17:
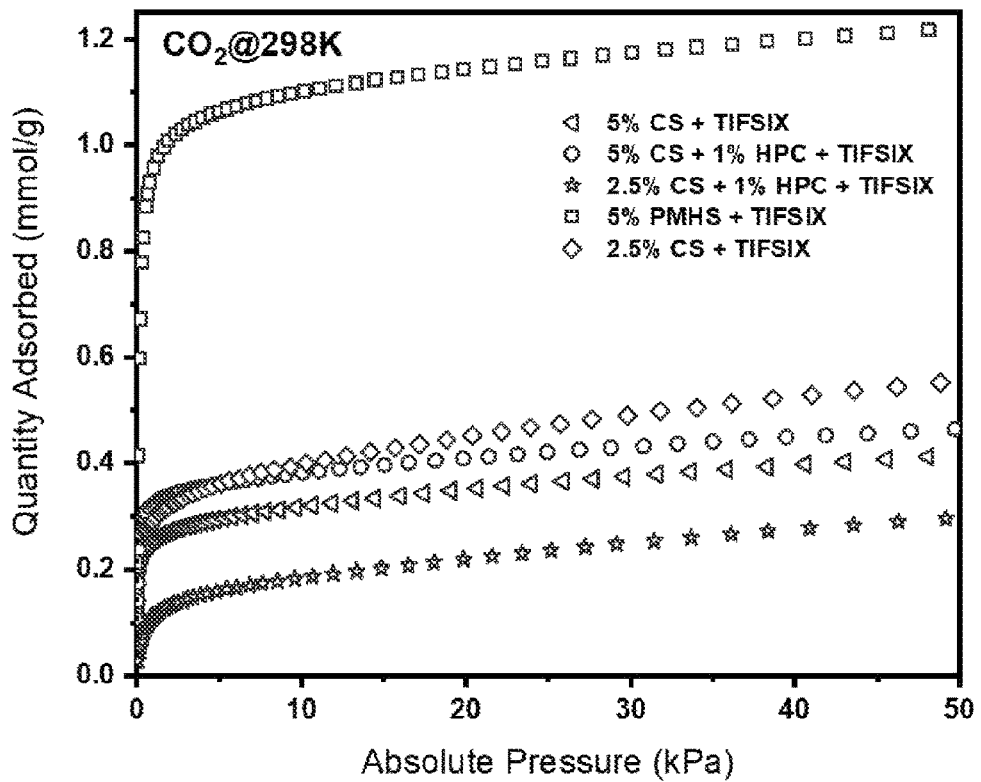
FIG. 17 illustrates the results of $CO_2$ breakthrough curves for different TIFSIX—binder coating compositions.
Figure 18:
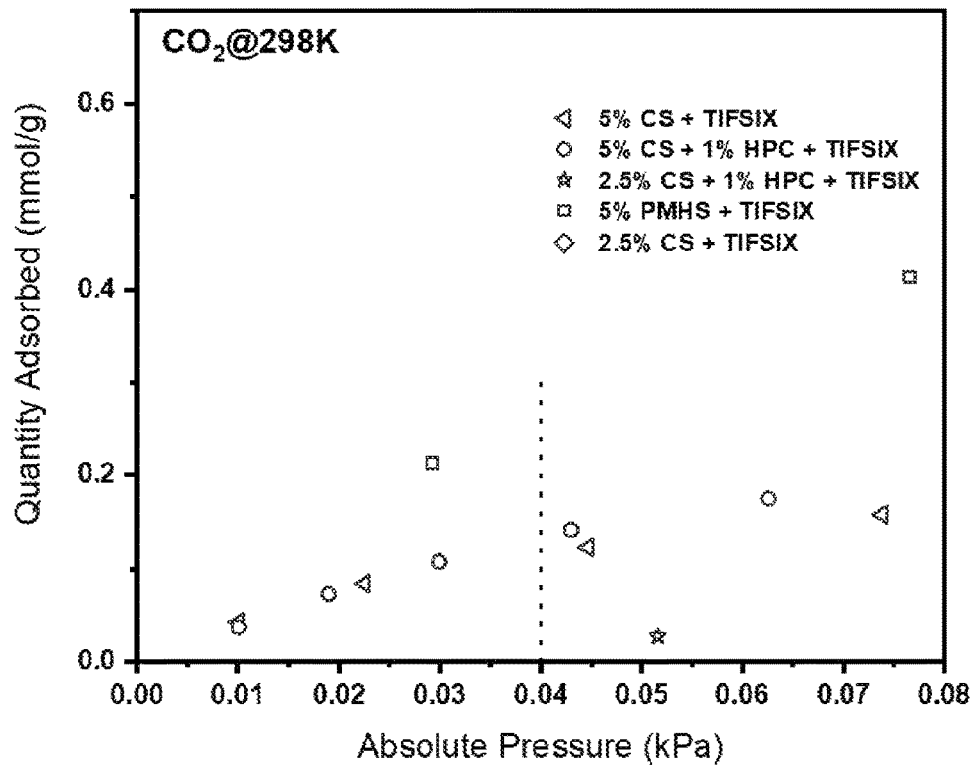
FIG. 18 illustrates the low pressure results of $CO_2$ breakthrough curves for different TIFSIX—binder coating compositions.

The results of these comparative experiments are set out in FIGS. 17 and 18 which illustrate the $CO_2$ breakthrough curves for the different TIFSIX—binder coating compositions. The CS based coatings show good adsorption results. However, the 5 wt % PMHS coating surprisingly shows much greater adsorption characteristics, providing the best initial (FIG. 18) and overall (FIG. 17) $CO_2$ adsorption.

Example 7—Preparation of Tifsix-3-Ni MOF {[Ni(Pyrazine)$_2$(Tif6)]n}

The following example provides the typical procedure for producing fluoride free TIFSIX-3-Ni for use in the adsorptive composite coating demonstrated in the preceding examples. The procedure is as follows:

Nickel nitrate hexahydrate (174.5 g, 0.6 mol) and ammonium hexafluorotitanate (118.8 g, 0.6 mol) were dissolved in 150 mL and 450 mL of deionised water, respectively. The two solutions were then mixed together and pyrazine (712.3 g, 8.9 mol) dissolved in 300 mL of deionised water added slowly, at a flow rate between 10-20 mL/min, to the resultant mixture. The combined solutions were put on the roller or shaker at 100 rpm for 3 days at room temperature to yield a precipitate of TIFSIX-3-Ni. The precipitate was washed with distilled water 5 times, followed by methanol 3 times and air dried in fume hood at room temperature for 3-5 days until fully dried. The dried solid was heated at 160° C. under vacuumed condition of 2 mbar for 48 h to obtain the desired TIFSIX-3-Ni MOF.

It should be appreciated that this method can be readily adapted to other M-XF6 MOF materials (M-Ni, Cu, Zn; X=Ti, Si) with minor modifications.

Example 8

Whilst the preceding examples all relate to adsorption of $CO_2$ on a TiFSiX based composite coating, it should be appreciated that the adsorptive composite coating could include other MOFs suitable for adsorbing different atmospheric gases. Table 5 provides examples of other MOFs and binders that could be used for alternate target gas adsorbates:

TABLE 5

Examples of suitable MOFs for adsorbing different target atmospheric gases.

| Gas | MOF | Binder hydrophobicity | Binder |
|---|---|---|---|
| Oxygen | CuBTC/Mg or Mn-MOF74 | Hydrophobic | Hydrophobic = Cellulose methyl siloxane, cellulose tridecanoate siloxane |
| carbon monoxide | CuBTC, PCN-250, MIL-100, FeBTC | Hydrophobic or Hydrophilic | Hydrophobic = EVA, Cellulose methyl siloxane Hydrophilic = PVP, PVA, TPU |
| Hydrogen | NOTT400, Mg or Mn-MOF74 | Hydrophobic or Hydrophilic | Hydrophobic = Cellulose methyl siloxane Hydrophilic = TPU |
| Nitrogen | M-MOF-74 series, FeBTC, UIO66 and UIO66-NH2, MOF808, | Hydrophobic or Hydrophilic | Hydrophobic = EVA, Cellulose methyl siloxane Hydrophilic = PVP, PVA, TPU |
| Argon | M-MOF-74 series | Hydrophobic or Hydrophilic | Hydrophobic = EVA, Cellulose methyl siloxane Hydrophilic = PVP, PVA, TPU |
| Methane | CuBTC, MOFs with high content aromatic rings (Cu2(ADIP), M-MOF-74 series, PCN-250 | Hydrophobic or Hydrophilic | Hydrophobic = EVA, Cellulose methyl siloxane Hydrophilic = PVP, PVA |
| Neon | Mg-MOF-74, SIFSIX, CuBTC | Hydrophobic or Hydrophilic | Hydrophobic = EVA, Cellulose methyl siloxane Hydrophilic = PVP, PVA |

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. An adsorption apparatus for capturing carbon dioxide from an atmospheric air based gaseous feed stream, comprising:

a housing enclosing at least one adsorption element for adsorbing carbon dioxide, the at least one adsorption element comprising at least one substrate having an adsorptive composite coating that comprises at least 50 wt % metal organic frameworks (MOFs) and at least one hydrophobic binder, the housing having an inlet through which the gaseous feed stream can flow to the at least one adsorption element and an outlet through which gas can flow out from the housing; and a desorption arrangement in contact with and/or surrounding the at least one adsorption element, the desorption arrangement being selectively operable between (i) a deactivated state, and (ii) an activated state in which the arrangement is configured to apply heat, a reduced pressure, or a combination thereof to the adsorptive composite coating to desorb at least a portion of the carbon dioxide from the adsorptive composite coating, wherein the at least one hydrophobic binder comprises at least one siloxane compound.

2. The adsorption apparatus according to claim 1, wherein the adsorptive composite coating has a thickness of at least one of:
less than 200 μm; or
greater than 30 μm.

3. The adsorption apparatus according to claim 1, wherein the adsorptive composite coating has an MOFs:hydrophobic binder ratio of 7.8:1 to 200:1 based on the total wt % of solids in the coating.

4. The adsorption apparatus according to claim 1, wherein the adsorptive composite coating comprises 80 to 97% MOF based on the total solid content in the adsorptive composite coating.

5. The adsorption apparatus according to claim 1, wherein the at least one siloxane compound of the at least one hydrophobic binder comprises poly (hydroxymethyl) siloxane, cellulose methyl siloxane, cellulose amino methyl siloxane or a combination thereof.

6. The adsorption apparatus according to claim 5, wherein the at least one hydrophobic binder further comprises
at least one additional hydrophobic binder comprising at least one cellulosic polymer selected from methyl cellulose, amino methyl cellulose, hydroxyl methyl cellulose, hydroxyethyl methylcellulose, ethylhydroxy ethylcellulose, hydroxypropyl cellulose, or carboxymethylcellulose.

7. The adsorption apparatus according to claim 5, wherein the at least one hydrophobic binder comprises at least one of:
between 3 and 10 wt % hydroxypropyl cellulose and between 0.2 and 10 wt % of a siloxane-cellulose polyester or derivative thereof; or
0.2 to 10 wt % poly (hydroxymethyl) siloxane, 3 to 10 wt % hydroxypropyl cellulose, and 0.2 to 5 wt % methyl cellulose.

8. The adsorption apparatus according to claim 1, wherein the adsorptive composite coating is hydrophobic and has a contact angle over 70 degrees.

9. The adsorption apparatus according to claim 1, wherein the housing contains a loading of at least 30 kg/m$^3$ of adsorptive composite coating.

10. The adsorption apparatus according to claim 1, wherein the MOFs comprise a metal-organic material (MOM) of general formula $[ML_2TIFSIX]_n$, n is 1 to $10_{18}$ wherein M is a divalent or trivalent metal, wherein L is a bifunctional linker molecule based upon two nitrogen donor moieties; and TIFSIX is hexafluorotitanate, hexafluorostannate or hexafluorosilicate.

11. The adsorption apparatus according to claim 1, wherein the adsorptive composite coating includes from 40 to 100 g/m$^2$ MOFs.

12. The adsorption apparatus according to claim 1, wherein MOFs comprise at least one of SIFSIX-3-Ni or TIFSIX-3-Ni.

13. The adsorption apparatus according to claim 1, wherein the at least one substrate comprises at least one of:
a flexible sheet;
a mesh;
a resistive heating material or resistive material coating;
a spiral rolled sheet; or
a spiral rolled cylinder.

14. The adsorption apparatus according to claim 13, comprising at least two adsorption elements having substrates comprising flexible sheets, each flexible sheet being separated by an insulating element that comprises one or more strips of insulating material extending between adjacent adsorption elements.

15. The adsorption apparatus according to claim 1, comprising at least two adsorption elements having substrates comprising flexible sheets, each flexible sheet being separated by an insulating element.

16. A method of capturing carbon dioxide from a gaseous feed stream, the method comprising at least one cycle of:
flowing a gaseous feed stream over at least one adsorption element enclosed within a housing, the at least one adsorption element comprising at least one substrate having an adsorptive composite coating that comprises at least 50 wt % metal organic frameworks, and at least one hydrophobic binder, such that the adsorptive composite coating adsorbs carbon dioxide from the gaseous feed stream; and
operating at least one desorption arrangement to apply heat, a reduced pressure, or a combination thereof to the adsorptive composite coating so as to release at least a portion of the adsorbed carbon dioxide from the adsorptive composite coating, thereby producing a gaseous product flow including carbon dioxide,
wherein the gaseous feed stream comprises an atmospheric gas based gaseous feed stream, and
wherein the at least one hydrophobic binder comprises at least one siloxane compound.

17. The method according to claim 16, wherein the desorption arrangement is configured to heat the adsorptive composite coating to a temperature of between preferably between 60 and 90° C.

18. The method according to claim 16, wherein the housing forms part of an adsorption apparatus.

19. The method according to claim 16, wherein the desorption arrangement is configured to heat the adsorptive composite coating to a temperature of between 60 to 150° C.

20. The method according to claim 16, wherein the carbon dioxide is from air, said air comprising less than 500 ppm of $CO_2$ and $H_2O$ concentrations of at least 1000 ppm and the selectivity for $CO_2$ is greater than 50%.

21. The adsorption apparatus according to claim 1, wherein the at least one hydrophobic binder comprises a cellulose-disiloxane polyester or a cellulose-oligosiloxane polyester.

* * * * *